(12) United States Patent
Salsburey et al.

(10) Patent No.: US 10,898,834 B2
(45) Date of Patent: Jan. 26, 2021

(54) METHOD OF MANUFACTURING A FLUID FILTER

(71) Applicant: GVS Filtration Inc., Findlay, OH (US)

(72) Inventors: Scott Allen Salsburey, Ottawa, OH (US); Julie Anne Graber, Findlay, OH (US); Christopher Anthony Schoonover, Findlay, OH (US); Todd William Meyer, Ottawa, OH (US); Bradley Allan Deeter, Findlay, OH (US); William Nichelson, Bellefontaine, OH (US)

(73) Assignee: GVS Filtration Inc., Findlay, OH (US)

( * ) Notice: Subject to any disclaimer, the term of this patent is extended or adjusted under 35 U.S.C. 154(b) by 364 days.

(21) Appl. No.: 15/852,884

(22) Filed: Dec. 22, 2017

(65) Prior Publication Data
US 2018/0200650 A1 Jul. 19, 2018

Related U.S. Application Data

(60) Provisional application No. 62/446,128, filed on Jan. 13, 2017.

(51) Int. Cl.
*B33Y 10/00* (2015.01)
*B01D 29/00* (2006.01)
(Continued)

(52) U.S. Cl.
CPC ........ *B01D 29/0093* (2013.01); *B01D 29/111* (2013.01); *B01D 35/0273* (2013.01);
(Continued)

(58) Field of Classification Search
None
See application file for complete search history.

(56) References Cited

U.S. PATENT DOCUMENTS

| 4,643,981 A | 2/1987 | Card |
| 5,902,480 A | 5/1999 | Chilton et al. |

(Continued)

FOREIGN PATENT DOCUMENTS

| DE | 102013014688 | 3/2015 |
| WO | WO0185308 | 11/2001 |

(Continued)

OTHER PUBLICATIONS

International Search Report for International Serial No. PCT/US2017/068258, dated Feb. 16, 2018, 2 pgs.
Extended European Search Report dated Jul. 27, 2020.

*Primary Examiner* — Edmund H Lee
(74) *Attorney, Agent, or Firm* — Dickinson Wright PLLC

(57) ABSTRACT

The present disclosure provides a method of manufacturing a filter, wherein the filter comprises a filter body formed of a porous filtration material and a plastic support structure, the method including performing a first additive manufacturing step to form an initial portion of the support structure; positioning filtration material above or on the initial portion; performing a second additive manufacturing step to form a secondary portion of the support structure such that the filtration material is between the initial and secondary portions. Additionally, the filter body can be enclosed by positioning a first portion of the filtration material to overlay a second portion of the filtration material; and connecting the first portion of the filtration material to the second portion of the filtration material to define a pocket within the filter body, the support structure configured to maintain spacing between the first and second portions of the filtration material.

13 Claims, 26 Drawing Sheets

(51) Int. Cl.
*B33Y 80/00* (2015.01)
*B29C 64/245* (2017.01)
*B01D 29/11* (2006.01)
*B01D 35/027* (2006.01)
*B29L 31/14* (2006.01)

(52) U.S. Cl.
CPC ............ *B29C 64/245* (2017.08); *B33Y 10/00* (2014.12); *B33Y 80/00* (2014.12); *B01D 2201/0415* (2013.01); *B01D 2201/0423* (2013.01); *B01D 2201/12* (2013.01); *B29L 2031/14* (2013.01)

(56) References Cited

U.S. PATENT DOCUMENTS

| | | |
|---|---|---|
| 2016/0107106 A1 | 4/2016 | Brown |
| 2016/0121271 A1 | 5/2016 | Lescoche et al. |

FOREIGN PATENT DOCUMENTS

| | | |
|---|---|---|
| WO | WO2015179800 | 11/2015 |
| WO | WO 2016/070904 A1 | 5/2016 |

METHOD OF MANUFACTURING A FLUID FILTER

CROSS REFERENCE TO RELATED APPLICATIONS

This application claims the benefit of U.S. Provisional Patent Application No. 62/446,128 filed Jan. 13, 2017, the content of which is hereby incorporated by reference in its entirety.

FIELD

The present disclosure relates generally to a method of manufacturing strainers or in-tank filters commonly used in fluid tanks, and more particularly a method of manufacturing such filters using additive manufacturing.

BACKGROUND

The statements in this section merely provide background information related to the present disclosure and may not constitute prior art.

Generally, filters and strainers, for example fuel filters, urea filters and coarse filters, are installed into a fluid system to filter impurities and damaging particles from the fluid system. Such filters may be conventional sock style filters comprised of layers of flat sheets of filtration media sealed together at the outer perimeter edges to form a pocket inside the filter between the layers of filtration media. These filters may be installed in a liquid tank, i.e. a fuel tank. Sock style in-tank filters are used for filtering or removing contamination from a fuel or other filtered fluid. Strainers, such as coarse filters, may be installed in a conduit or pipe in which the fluid flows to catch larger debris or contaminants. Additionally, the filters may be conventional pleated or flat formed filters used for installing into a housing for filtering or removing contamination from air or other fluid.

Generally, filters and strainers include a filtration component and a structural component. The filtration component is typically a porous filtration material with a predetermined pore size to allow a fluid to pass through the material while preventing any undesired particulates that are larger than the pore size from passing. The porous material typically is not self-supporting, i.e. the material tends to collapse or distort when fluid is passed through it. In some instances, distortion of the filtration material may include the layers of the filtration material bunching together or compressing, which may result in the filter being less effective.

The distortion of the filtration material is typically reduced or prevented by providing a structural component within or around the porous filtration material. The structural component typically is sufficiently rigid to withstand the force of the fluid as it passes through the filter and the force exerted on the filtration material by the filtered particulates. The structural component may also assist in maintaining a desired shape of the filter and a desired spacing between the layers of the filtration material. The structural component is typically a molded piece of plastic or multiple pieces of molded plastic to provide support and rigidity to the porous filtration material. Additionally, the structural component may assist in maintaining the desired spacing between layers of the porous filtration material as the material is subjected to the force of the fluid flowing across the filtration material.

Typically, the structural component is formed by a molding process. For in-tank filters this process may be insert molding. Insert molding typically requires extensive development time and investment to design, produce, and test new mold dies and tooling. We have discovered that due to these limitations, the insert molding process is not well-suited for producing cost-effective prototypes or low volume productions. The insert molding process additionally limits the shape and design of the structural components. For example, insert molding is generally limited to forming simple, continuous shapes having a uniform cross-section. Any complexity in the shape of the structural component typically results in additional molding steps, additional tool cavities and complexity, and additional labor, which increase production time and costs. We have also discovered that the tools used in the insert molding process are designed to crush the filtration material around the areas which they mold to reduce flash, thereby reducing filtering area and the filtration performance of the filter. Likewise, the structural component itself can block the pores of the filtration material, thereby reducing filtering area and the filtration performance of the filter.

Further areas of applicability will become apparent from the description provided herein. It should be understood that the description and specific examples are intended for purposes of illustration only and are not intended to limit the scope of the present disclosure.

SUMMARY

The present disclosure provides a method of manufacturing a strainer or filter for filtering fluids, wherein the fluid filter comprises a filter body formed of a porous filtration material and a rigid or semi-rigid support structure, such as from plastic, joined to the filter body, the fluid filter defining horizontal and vertical axes. The manufacturing method includes performing a first additive manufacturing step to form an initial portion of the support structure; positioning the porous filtration material above or on the initial portion of the support structure; performing a second additive manufacturing step to form a secondary portion of the support structure as a continuation of the initial portion of the support structure such that the porous filtration material is positioned between the initial and secondary portions, thereby joining the support structure to the filtration material; positioning a first portion of the porous filtration material to overlay a second portion of the porous filtration material; and connecting the first portion of the porous filtration material to the second portion of the porous filtration material at a seam or fold to define a pocket within the filter body between the first portion and second portion of the porous filtration material, the support structure configured to maintain spacing between the first and second portions of the filtration material.

According to one form of the present disclosure, the initial portion of the support structure formed during the first additive manufacturing step may be plurality of discrete pillars. The discrete pillars may be indirectly connected through the porous filtration material.

According to one form of the present disclosure, the first additive manufacturing step may include forming at least one connection projection integral with and extending from the initial portion of the support structure. The connection projection may extend in a direction parallel to the vertical axis of the filter. The connection projection is formed having a predetermined shape and a predetermined height. When the initial portion of the support structure includes the connection projection, the secondary portion of the support structure may be formed as a continuation of at least one connection projection during the second additive manufacturing step such that the secondary portion of the support structure is spaced apart from the initial portion of the support structure at a distance equal to the height of the connection projection. The height of at least one connection projection may correspond to a thickness of the porous filtration material.

According to one form of the present disclosure, the method may further include the step of forming at least one passageway through the porous filtration material in the direction parallel to the vertical axis. The at least one passageway may correspond to the shape of the at least one connection projection. According to this form of the present disclosure, the step of positioning the porous filtration material above or on the initial portion of the support structure may include aligning the at least one connection projection within the at least one passageway in the porous filtration material.

According to various forms of the present disclosure, the support structure may be formed having a non-uniform cross sectional shape. Additionally, the secondary portion of the support structure formed during the second additive manufacturing step may be a plurality of discrete pillars.

Additionally, the method may further include the step of forming an initial portion of a connector port during the first additive manufacturing step, positioning the porous filtration material above or on the initial portion of the connector port, and forming a secondary portion of the connector port during the second additive manufacturing step, such that the porous filtration material is positioned between a plurality of layers of the connector port, thereby joining the connector port to the filtration material.

According to various forms of the present disclosure, a plurality of different plastic materials may be used during the first and second additive manufacturing steps to form at least one living hinge on the support structure. Additionally, a plurality of materials, such as plastics and elastomerics, may be used during the first and second additive manufacturing steps to form at least one sealing region on the support structure.

The present disclosure further provides a method of manufacturing a filter for filtering gases or liquids in a system, wherein the fluid filter comprises a porous filtration material and a support structure. The method includes forming the support structure one layer at a time using additive manufacturing and layering a sheet of the porous filtration material between a plurality of layers of the support structure. The steps of the method may be iteratively performed a predetermined number of times. The support structure may be formed having a non-uniform cross sectional shape in the vertical axis direction. Sheets of filtration material may be layered within the support structure spaced apart at predetermined increments. A plurality of plastic materials may be used during the additive manufacturing forming step to form at least one living hinge and/or at least one sealing region on the support structure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
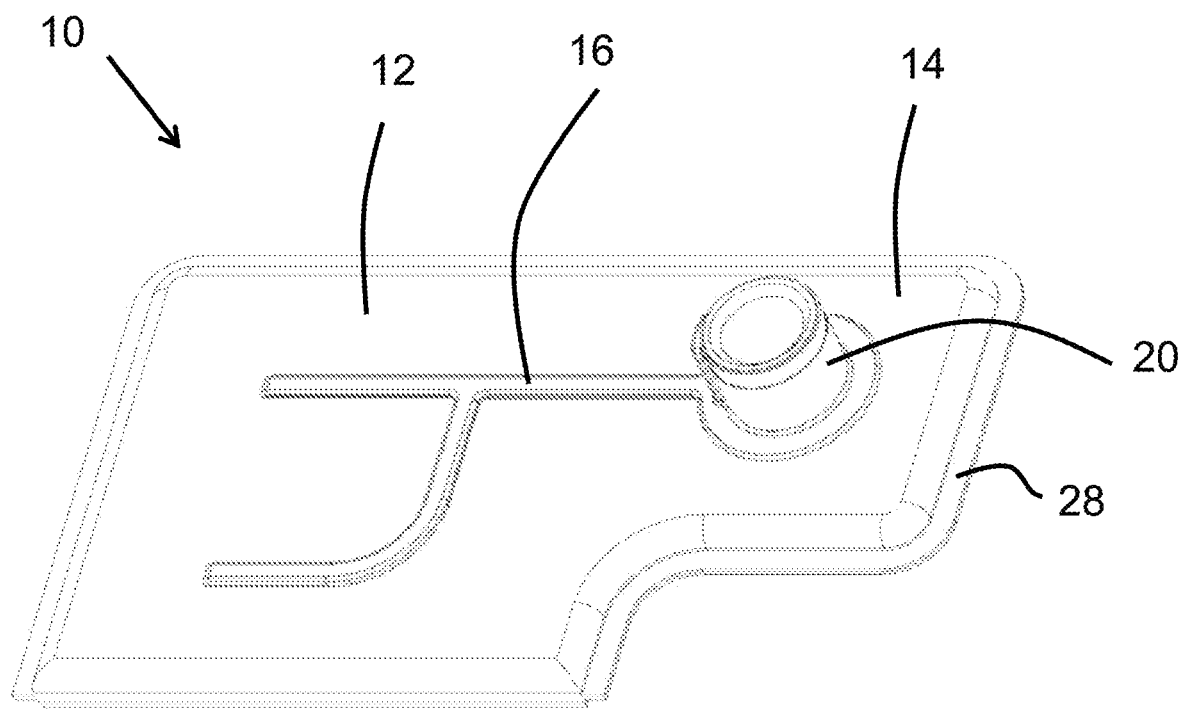
FIG. 1 is an isometric view of a fluid filter manufactured according to one form of a manufacturing method of the present disclosure.
Figure 10:
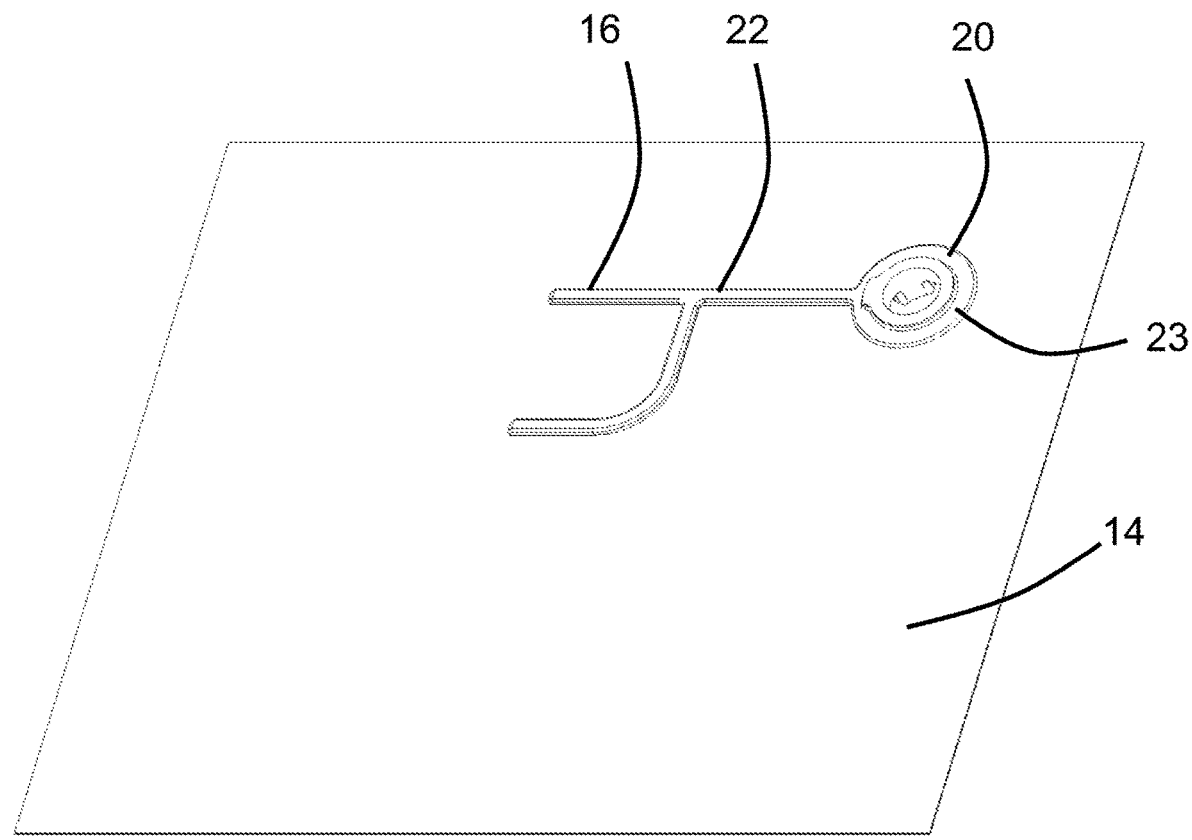
Figure 11A:
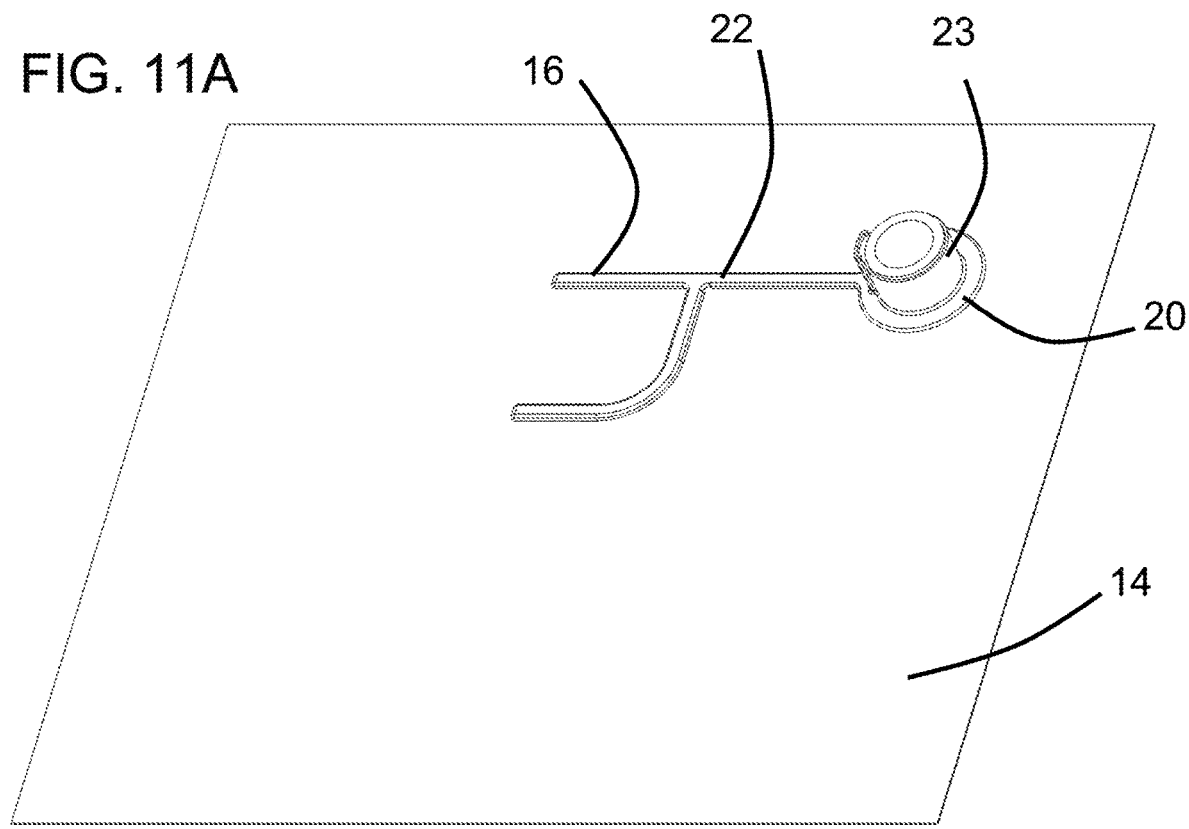
Figure 11B:
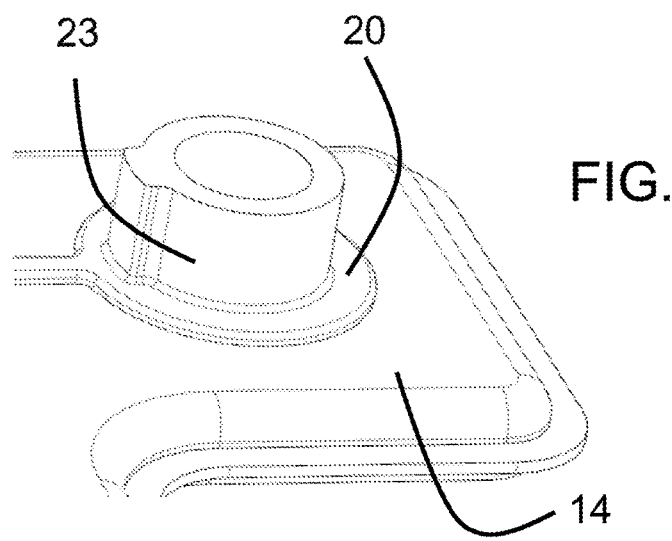
Figure 12A:
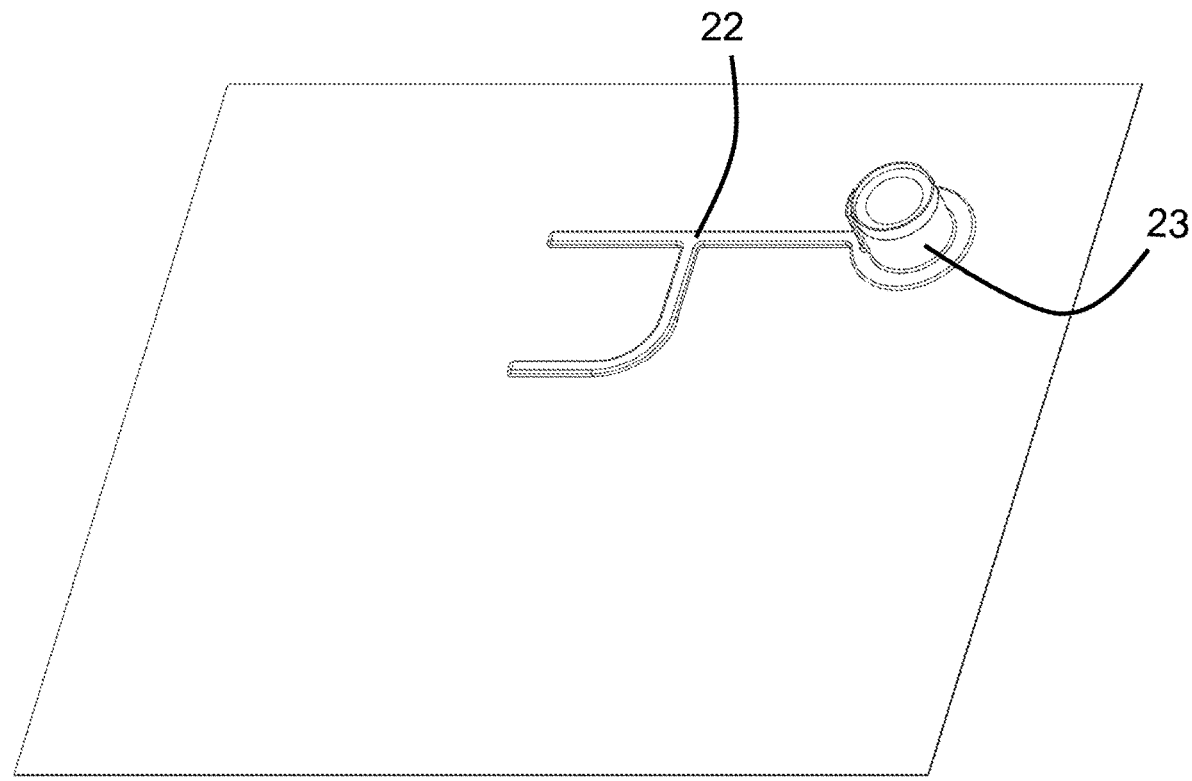
Figure 12B:
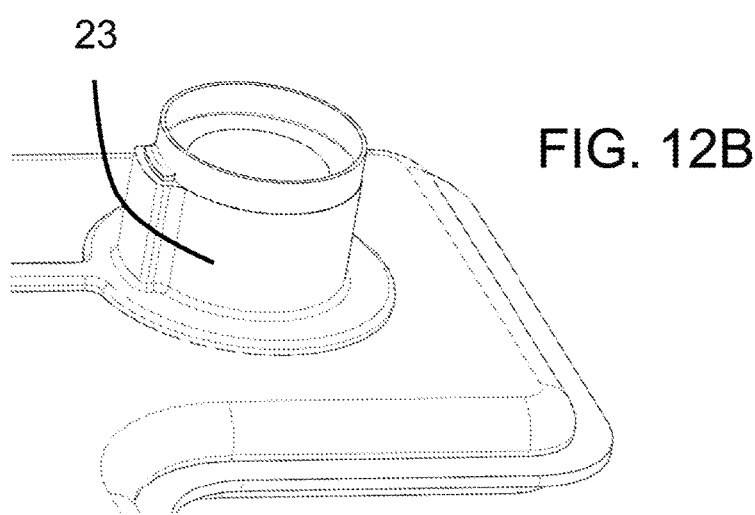
Figure 13A:
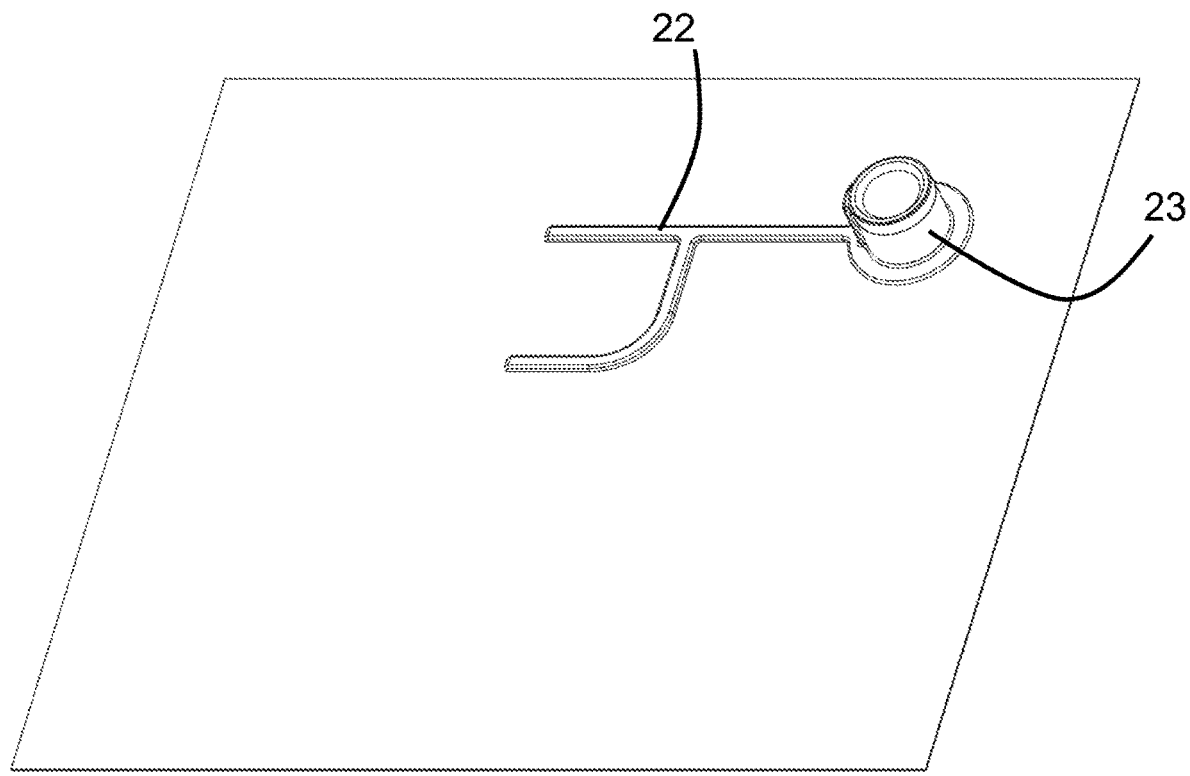
Figure 13B:
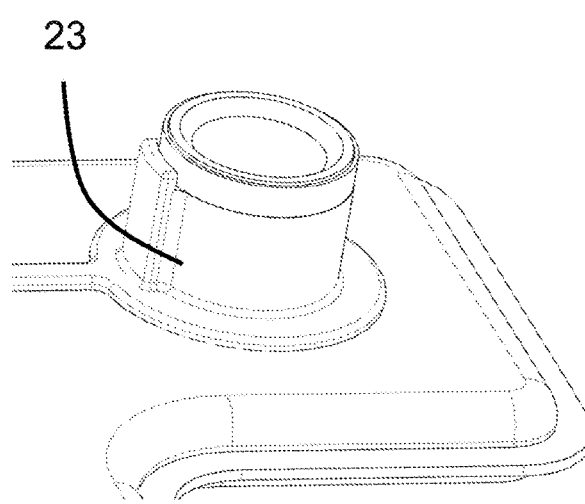
Figure 14A:
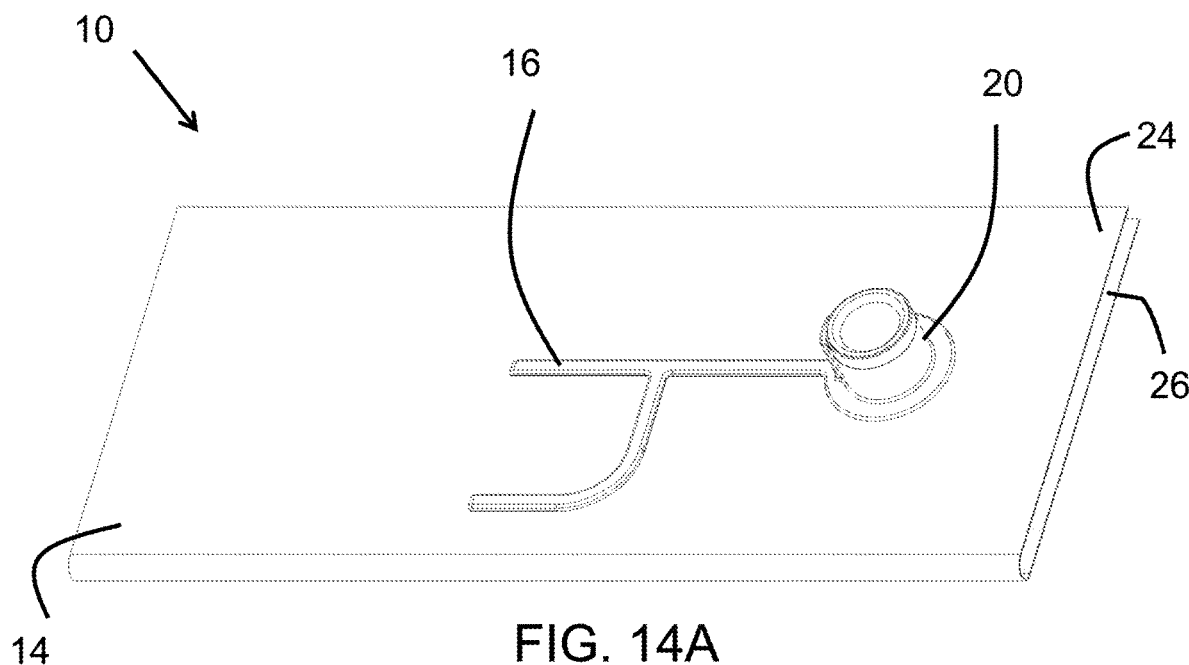
Figure 14B:
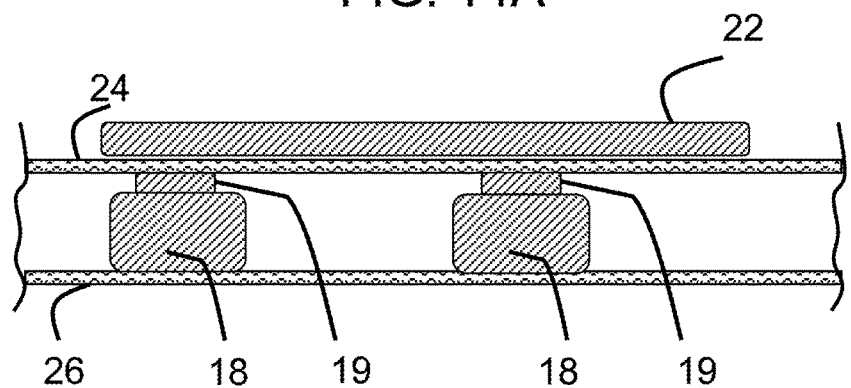
Figure 15:
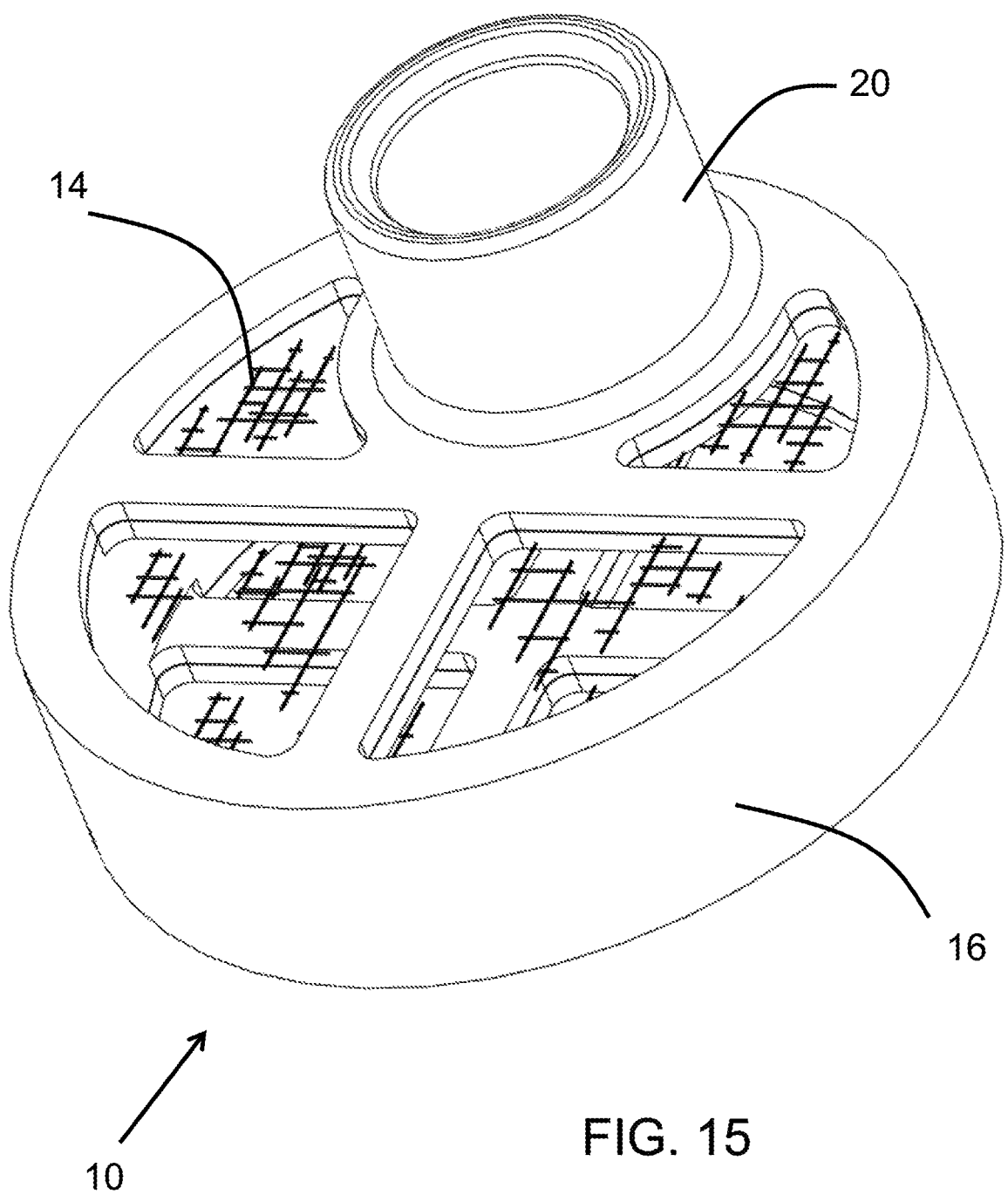
Figure 16:
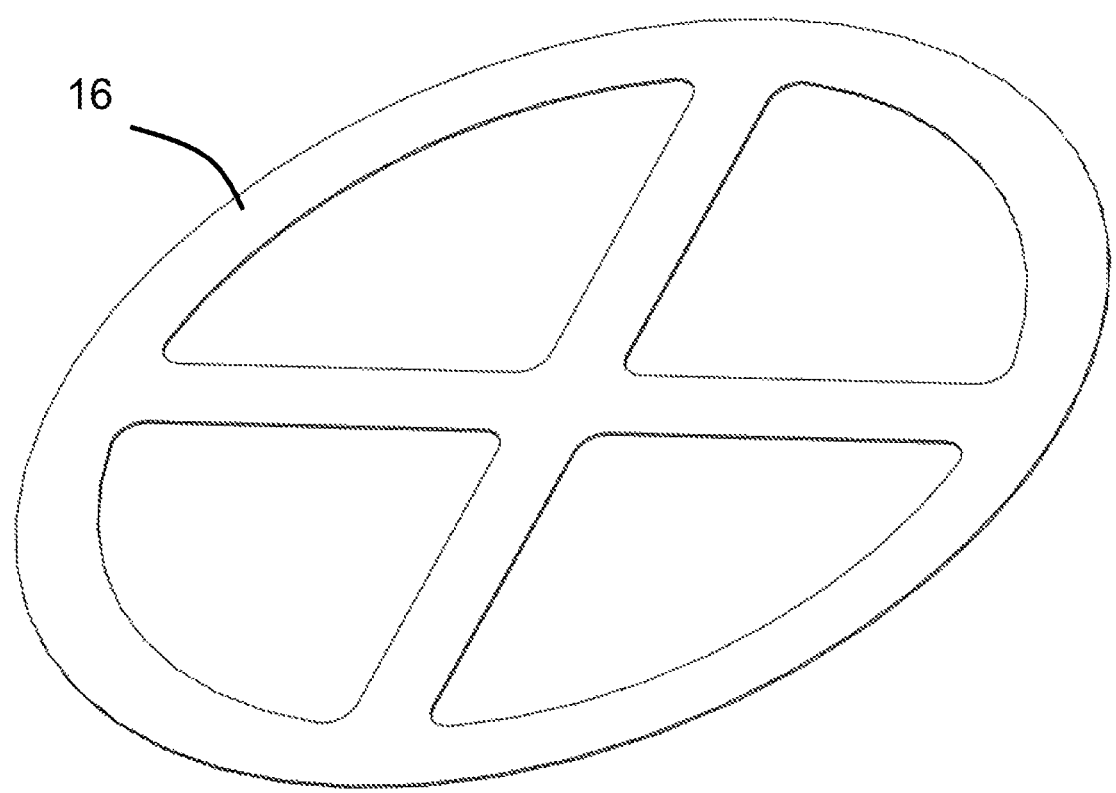
Figure 17:
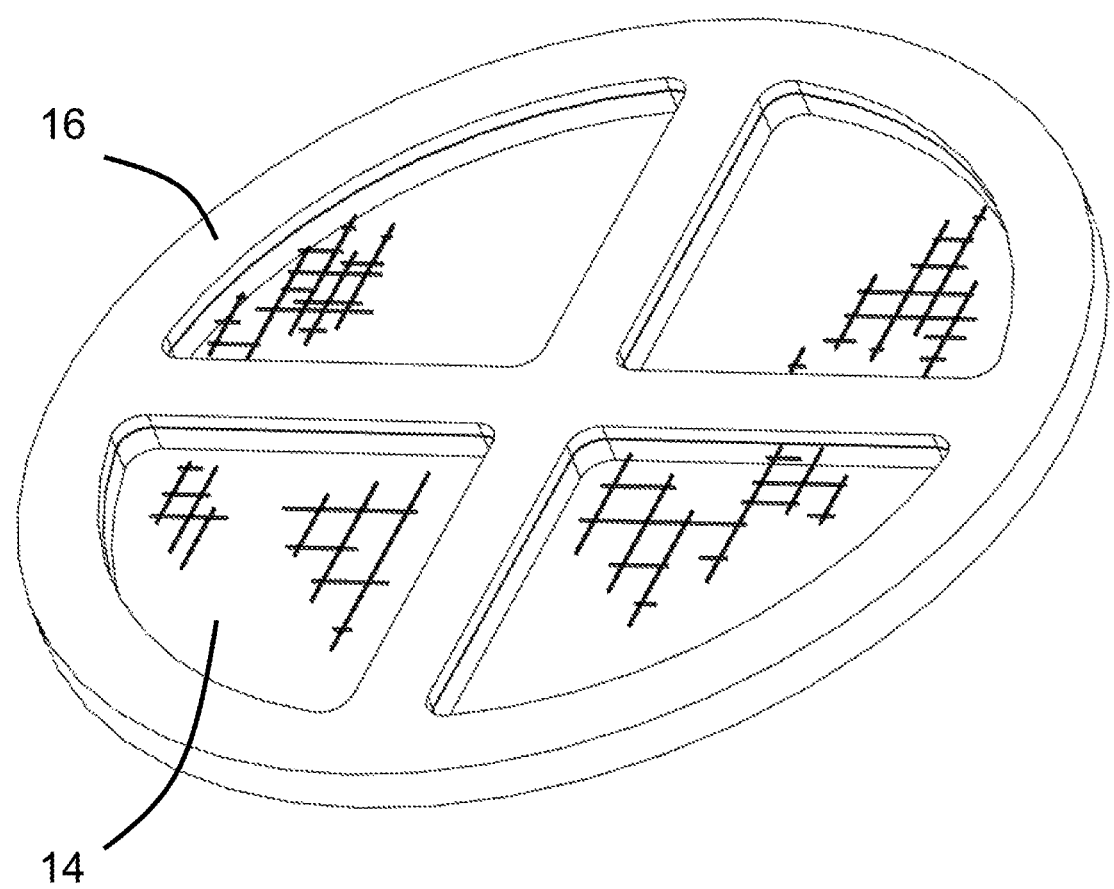
Figure 25A:
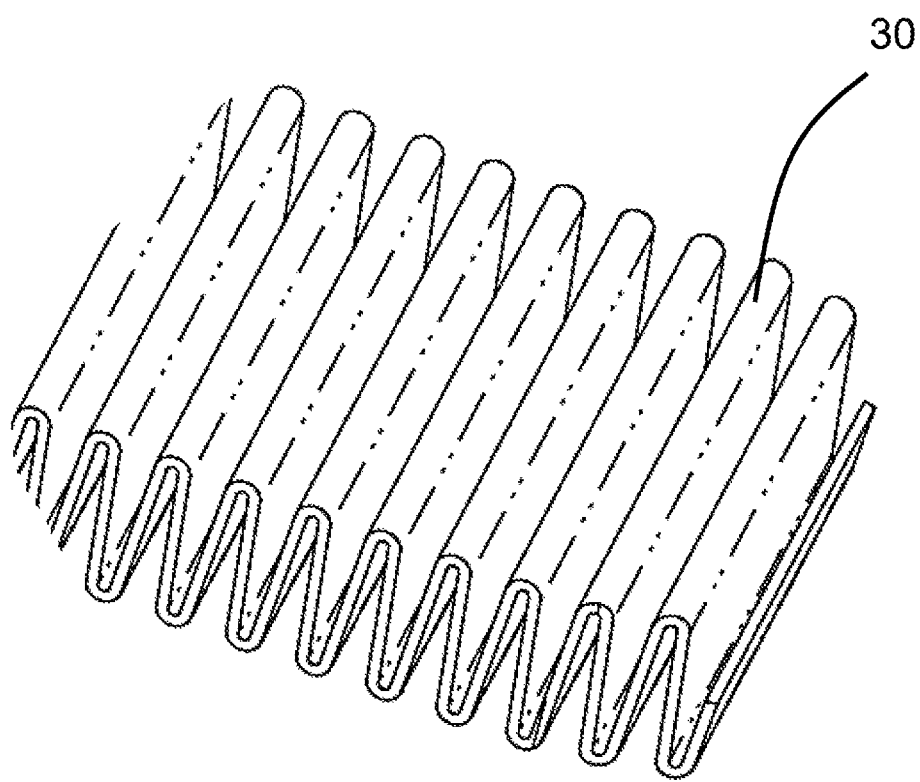
Figure 25B:
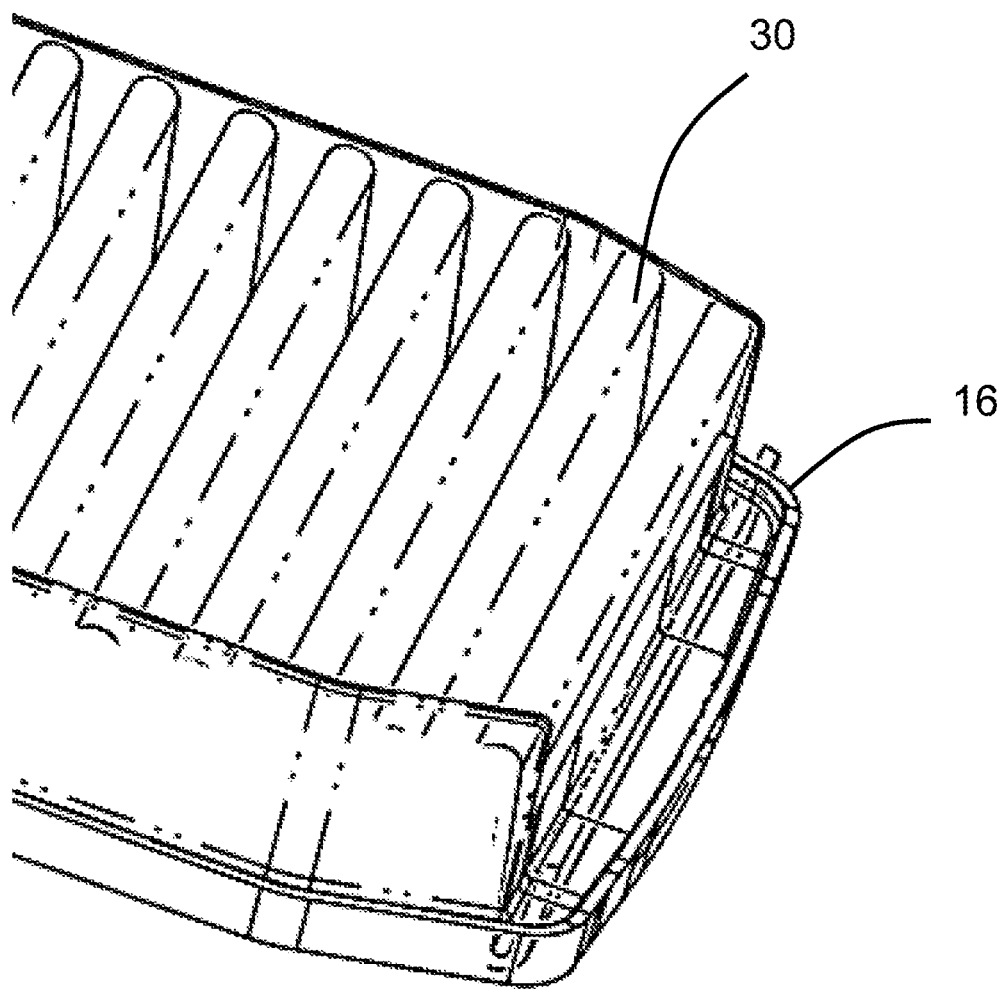

FIGS. 5A, 6A, 7A, 8A, and 9A are isometric views of various forms of an initial portion of a support structure having connection projections formed during the first additive manufacturing step of the method according to various forms of the present disclosure, these are not intended to limit the breadth of limitless sizes and shapes of the support structure;

FIGS. 5B, 6B, 7B, 8B, and 9B are isometric views of the initial portion of a support structure of FIGS. 5A, 6A, 7A, 8A, and 9A, respectively, with porous filtration material positioned according to the positioning step the present disclosure, these are not intended to limit the breadth of limitless sizes and shapes of the support structure;

FIG. 10 is an isometric view of the fluid filter after the positioning step of one form of the manufacturing method according to the present disclosure;

FIG. 11A to FIG. 13B are isometric views showing a method for manufacturing a fluid filter having a connector port according to one form of the present disclosure;

FIG. 14A is an isometric view of a folding step of a method for manufacturing the fluid filter of FIG. 1;

FIG. 14B is a cross-sectional view of the folding step of a method for manufacturing the fluid filter of FIG. 1;

FIG. 15 is an isometric view of a fluid filter manufactured according to one form of a manufacturing method of the present disclosure;

FIG. 16 is an isometric view of a first layer of a support structure of the fluid filter for FIG. 15 formed using additive manufacturing according to one form of the present disclosure;

FIG. 17 is an isometric view of a sheet of porous filtration material layered between a plurality of layers of the support structure of the filter of FIG. 15 manufactured according to one form of the present disclosure;

FIG. 18 to FIG. 24 are isometric views of the fluid filter of FIG. 15 in various stages of the manufacturing method according to one form of the present disclosure;

FIG. 25A is an isometric view of porous filtration material that has been folded into pleats and formed into the shape of the filter body; and FIG. 25B is an isometric view of the porous filtration material of FIG. 25A processed with a support structure around the filtration material to form the shape of the filter body.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Further areas of applicability will become apparent from the description provided herein. It should be understood that the description and specific examples are intended for purposes of illustration only and are not intended to limit the scope of the present disclosure.

The present disclosure provides a method of manufacturing a fluid filter 10 for filtering liquids. As shown in FIG. 1, a fluid filter 10 manufactured according to one method of the present disclosure includes a filter body 12 formed of a porous filtration material 14 and a plastic support structure 16 joined to the filter body. The fluid filter 10 defines a horizontal axis and a vertical axis.

One manufacturing method of the present disclosure includes performing a first additive manufacturing step, positioning the porous filtration material, performing a second additive manufacturing step, folding the porous filtration material or adding a second layer of porous filtration material, and connecting the two layers of porous filtration material at a seam. Generally, additive manufacturing includes the use of a computer, three dimensional modeling software, machine equipment, such as a three dimensional printer, and layering material, such as a plastic that can be discharged from the printer. A computer model or sketch is produced using the three dimensional software and the equipment or printer lays down or adds successive layers of discharged plastic material, in a layer-upon-layer fashion to fabricate a three dimensional object.

Figure 2:
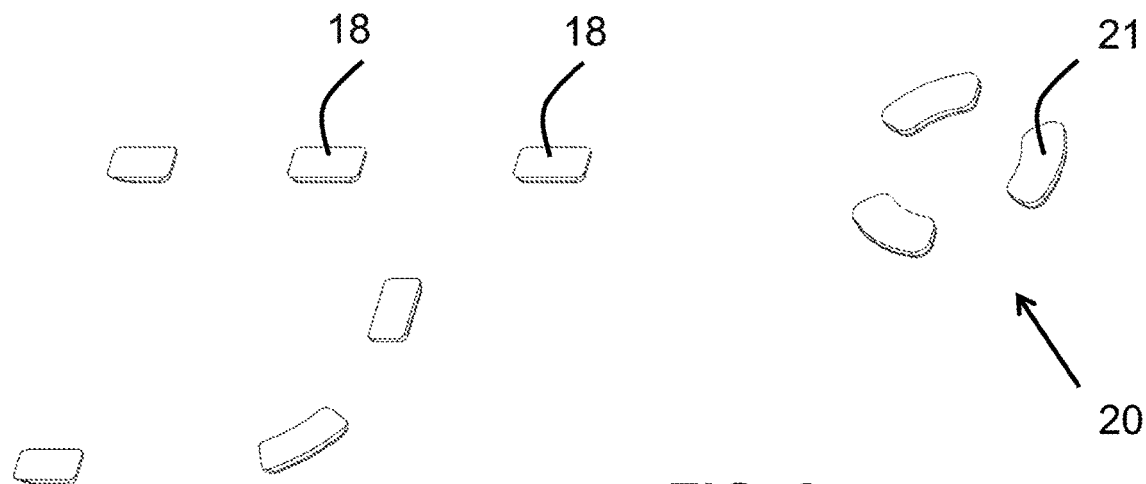
FIG. 2 is an isometric view of an initial portion of a support structure formed in a first additive manufacturing step of according to the present disclosure.

As shown in FIG. 2, the first additive manufacturing step of one method of the present disclosure forms an initial portion 18 of the support structure 16. The initial portion 18 may be built up layer upon layer to increase the height of the initial portion 18 based on the predetermined design. As shown in the figures, the support structure is in the shape of an "h"; however, the support structure may be formed in any other suitable shape and size, and include any number of supports based on the desired filter configuration. The number of discrete pillars can range from one to more than twenty depending on the size and shape of the filter.

Figure 3:
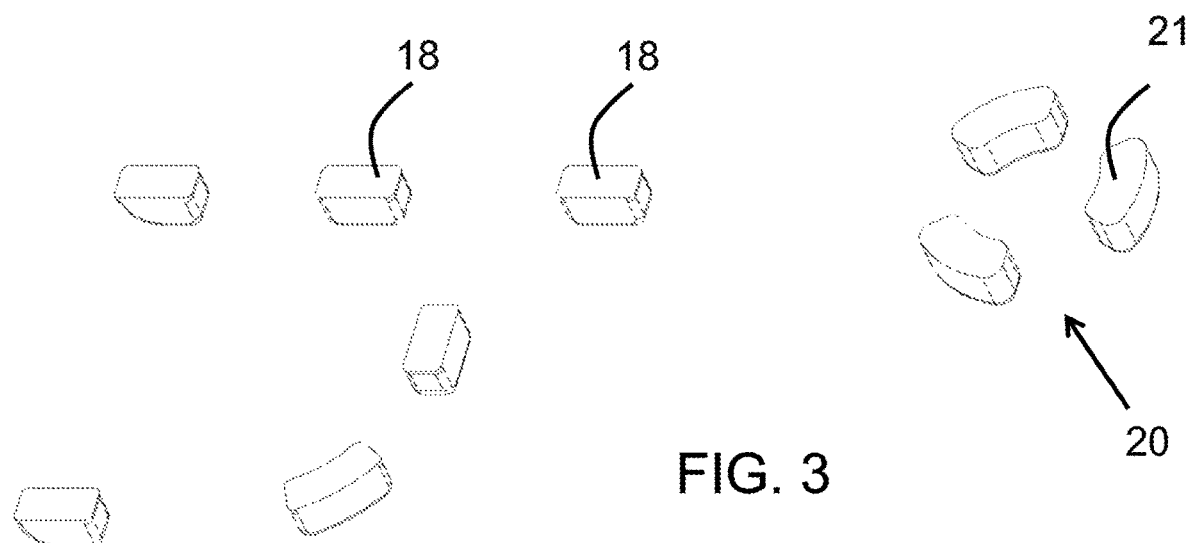
FIG. 3 is an isometric view of the initial portion of the support structure further formed upon the initial portion of the support structure of FIG. 2.
Figure 4A:
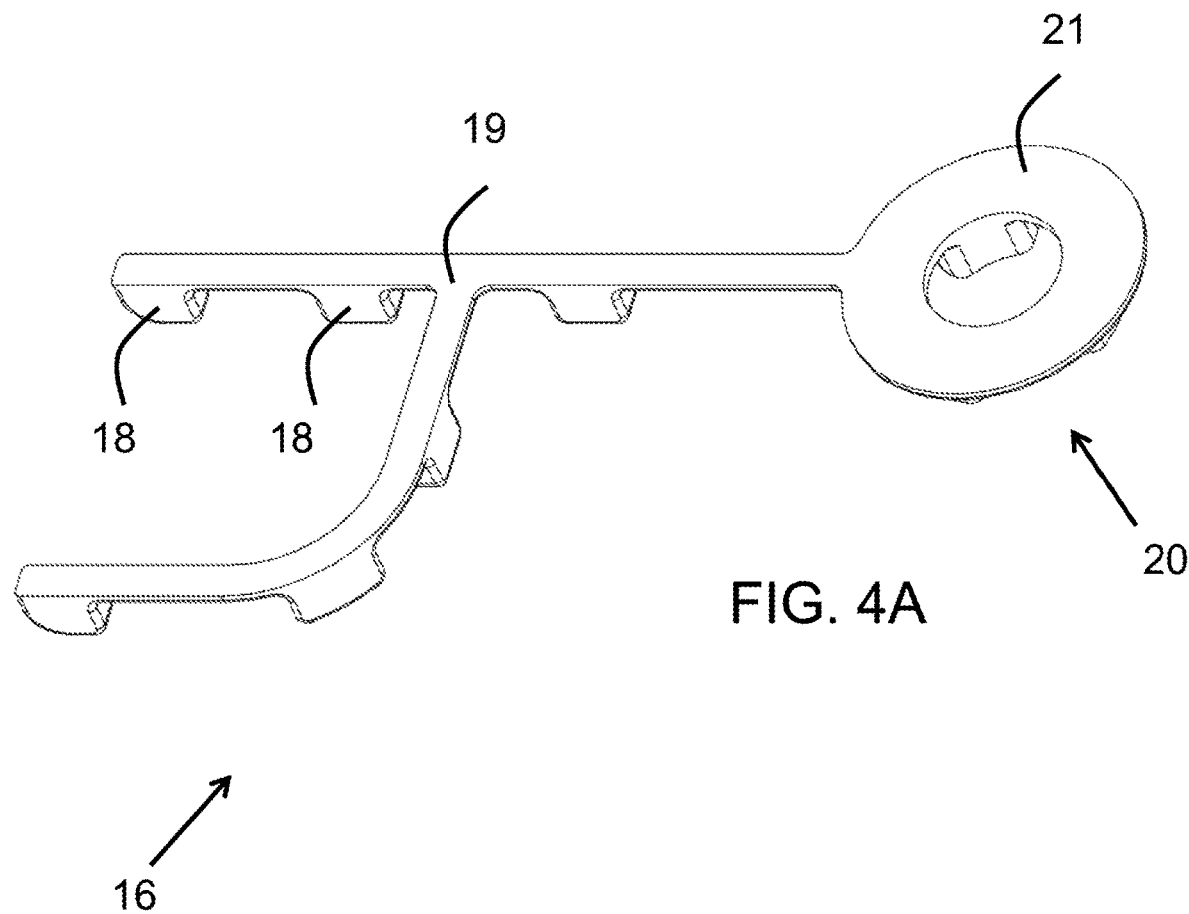
FIG. 4A is an isometric view of an alternative initial portion of the support structure further formed upon the initial portion of the support structure of FIG. 2.
Figure 4B:
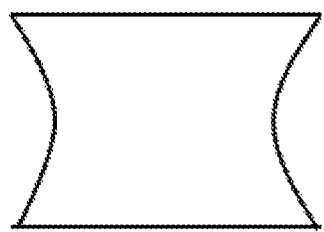
FIGS. 4B-4E are cross-sectional views of the initial portion of the support structure of FIG. 2, these are not intended to limit the breadth of limitless sizes and shapes of the support structure.
Figure 4C:
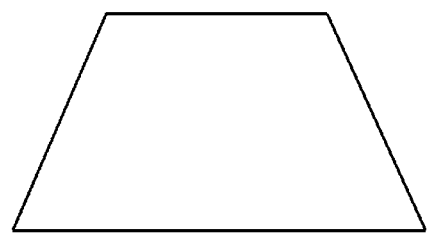
Figure 4D:
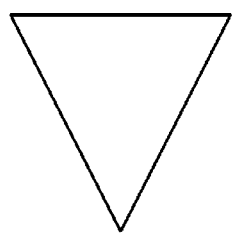
Figure 4E:
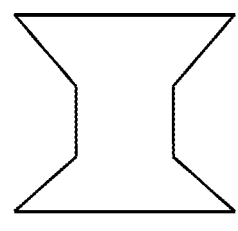
Figure 5A:
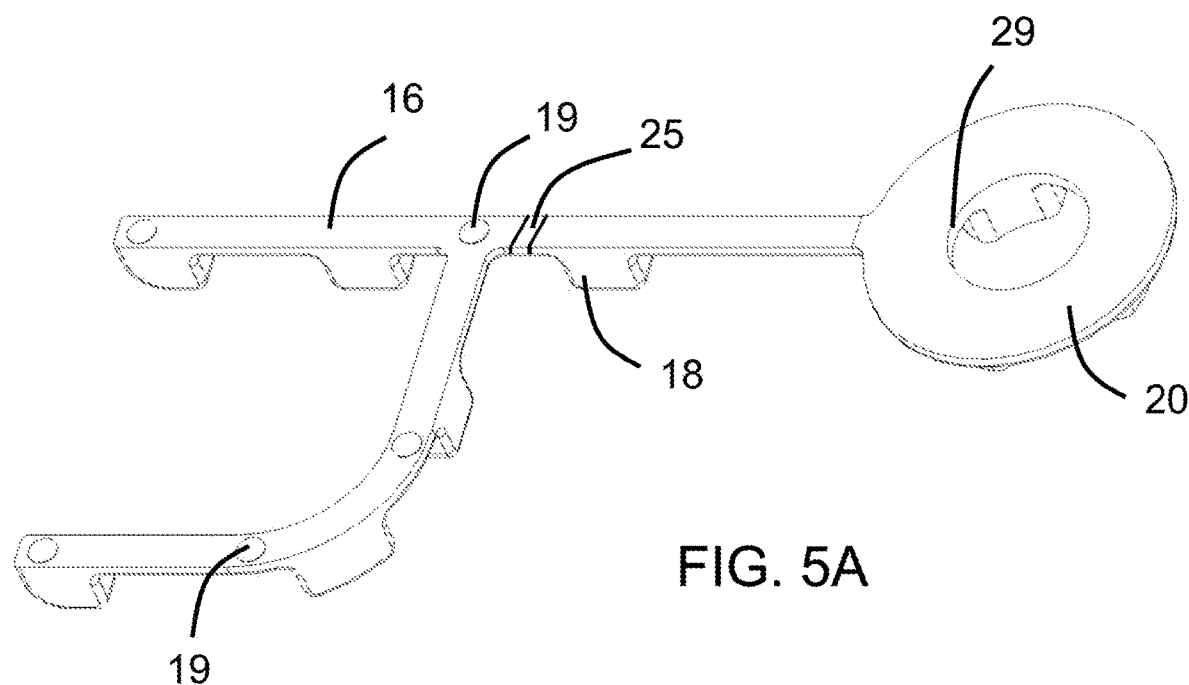
Figure 5B:
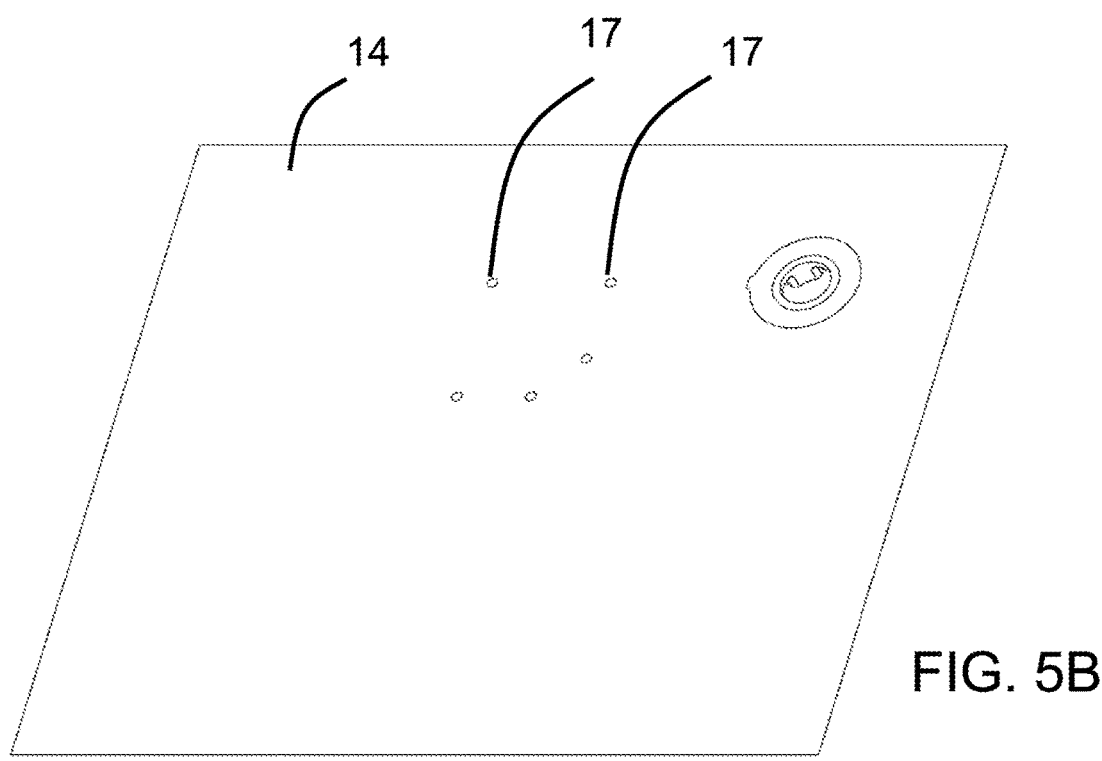
Figure 6A:
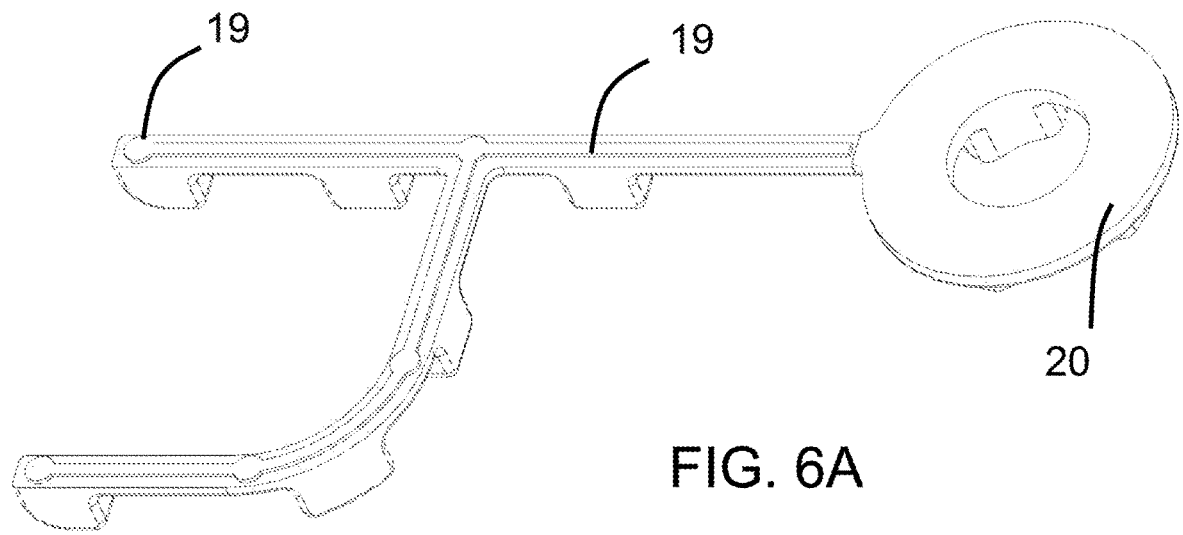
Figure 6B:
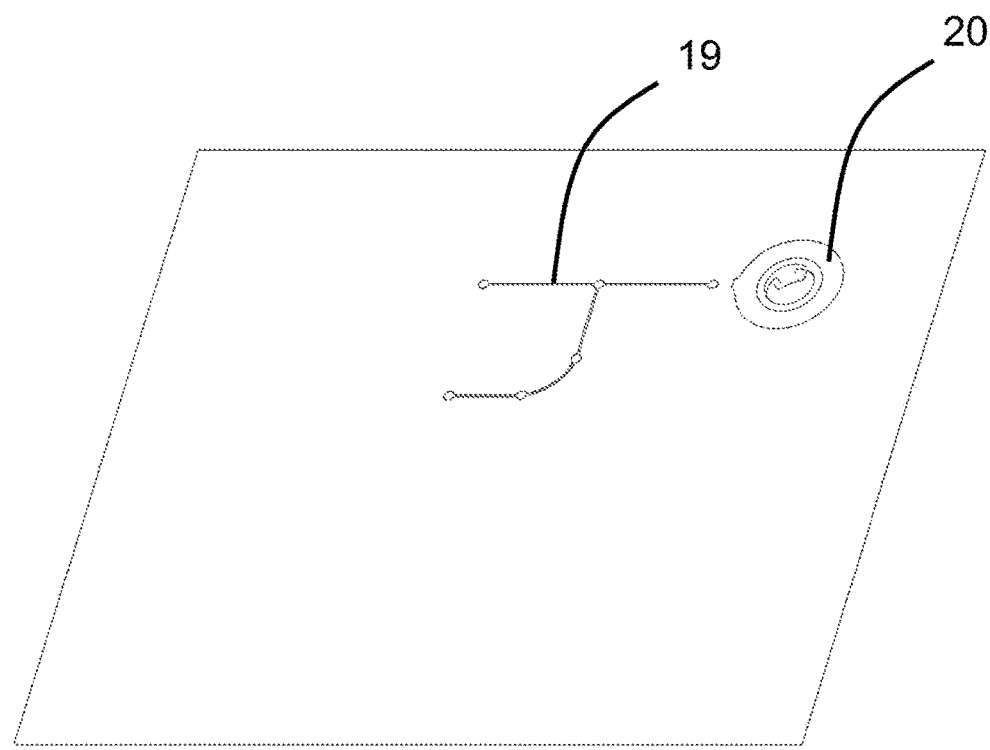
Figure 7A:
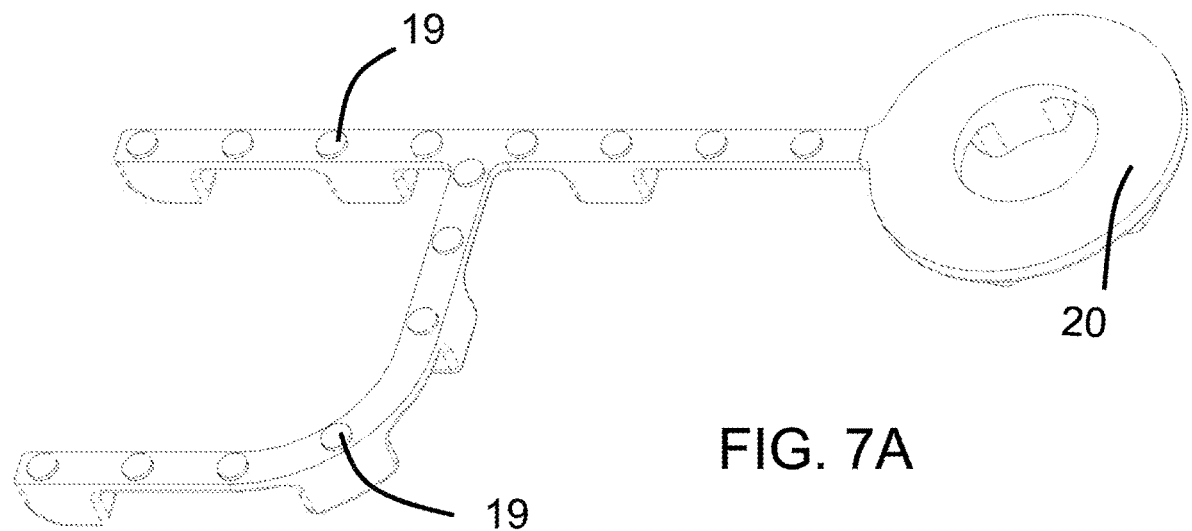
Figure 7B:
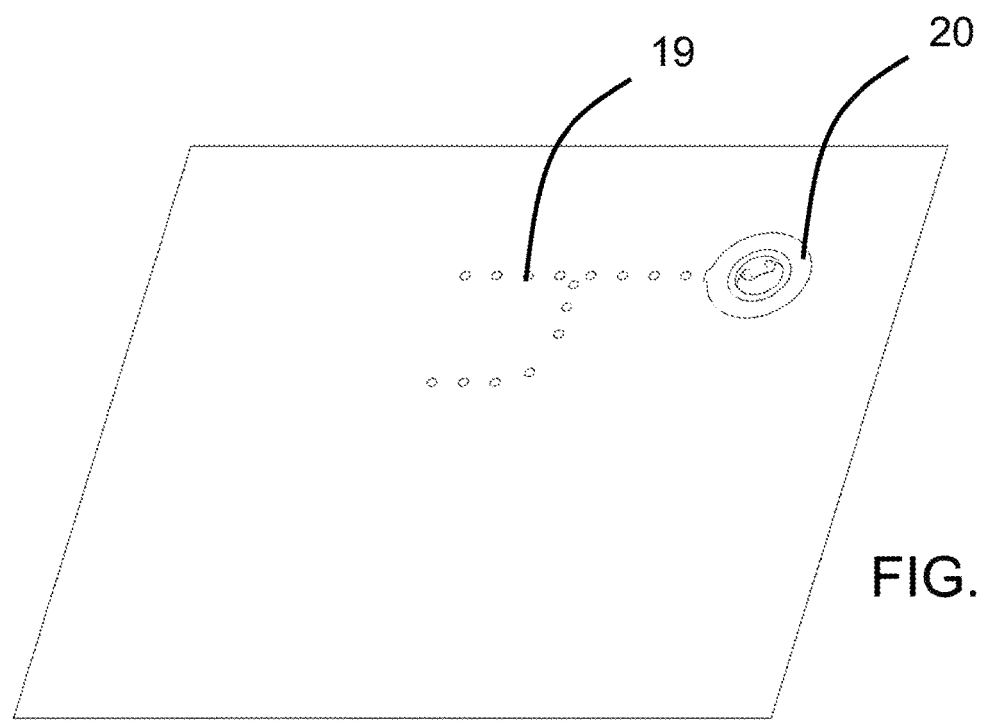
Figure 8A:
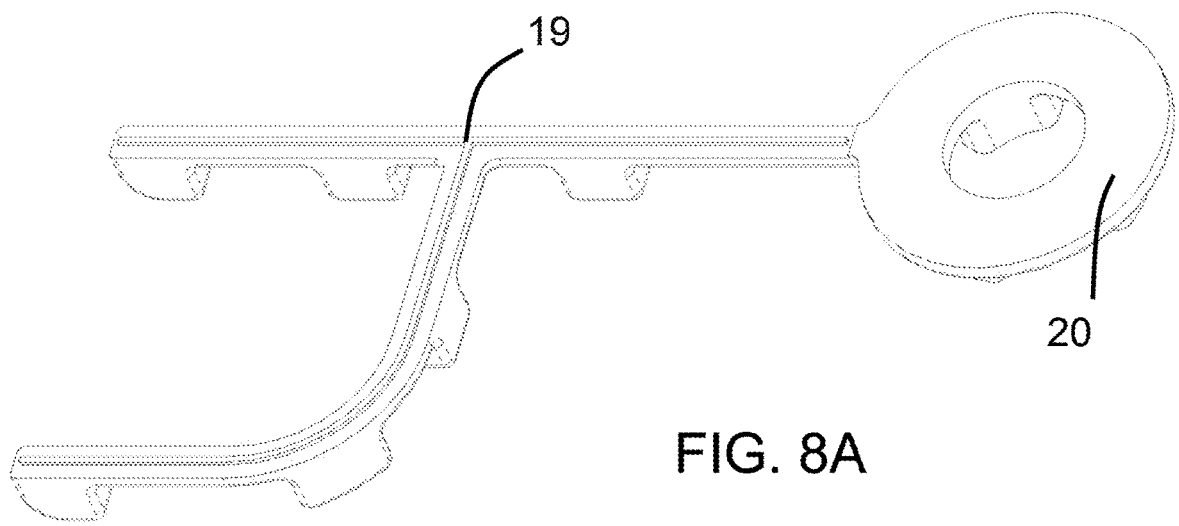
Figure 8B:
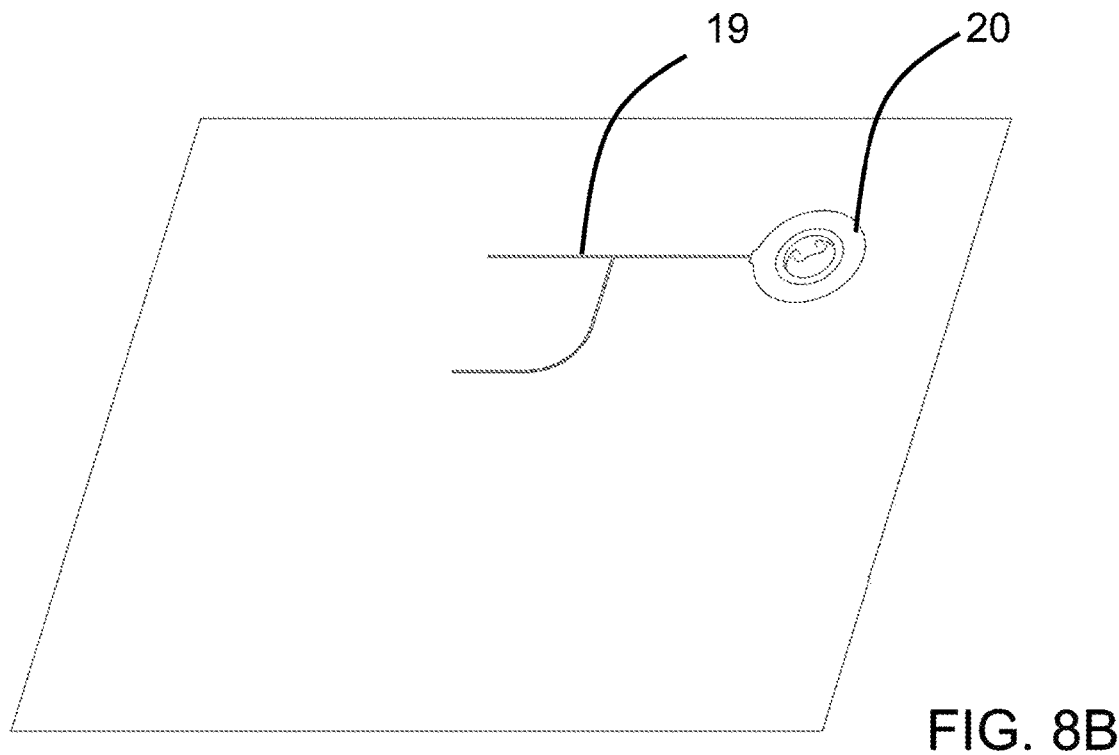
Figure 9A:
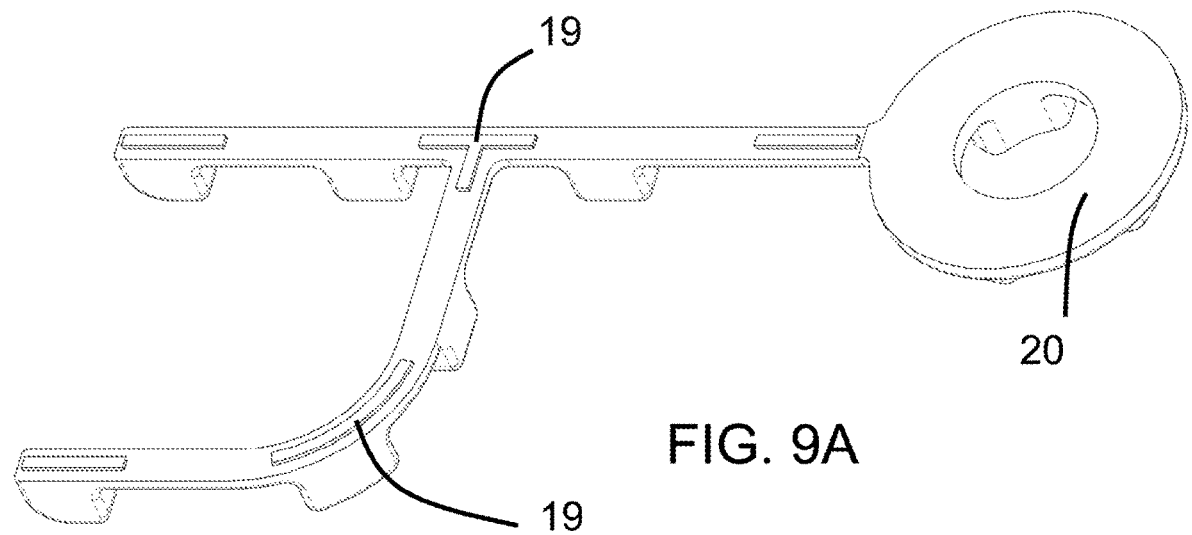
Figure 9B:
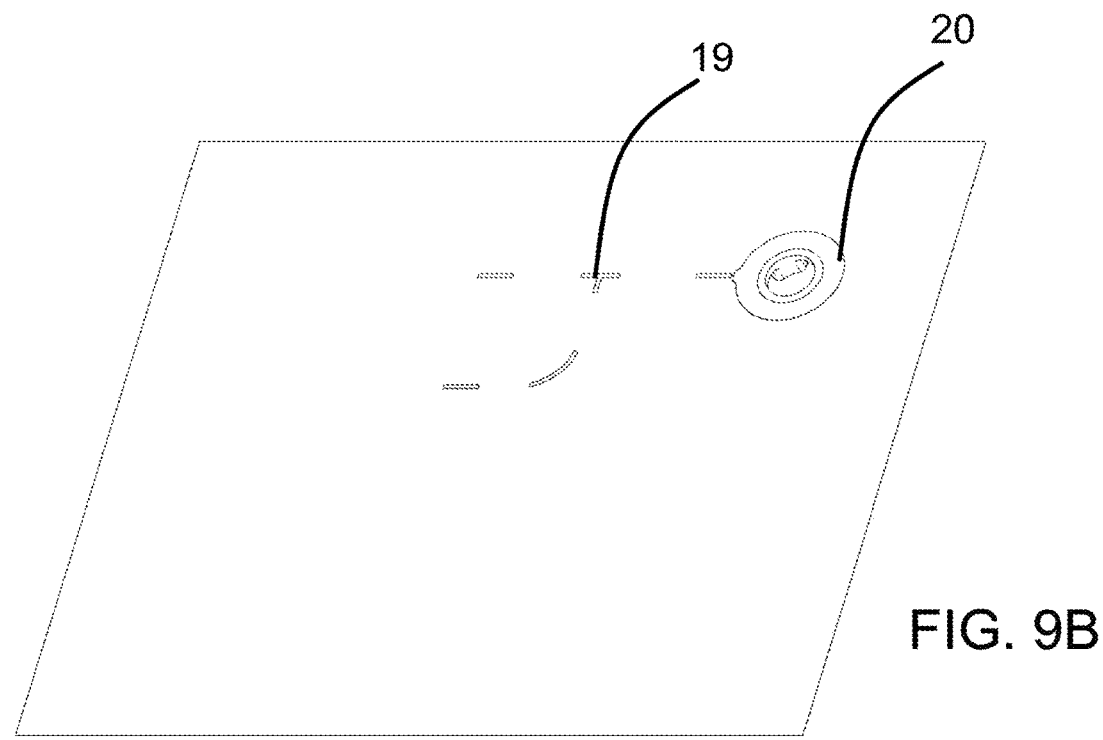

As shown in FIG. 3, the initial portion 18 may be a plurality of discrete pillars. Providing the initial portion 18 of the support structure 16 as discrete pillars reduces the surface area of the initial portion 18 and therefore reduces the area of the support structure 16 that will be in contact with the filtration material, thereby increasing the filtering area of the filter. The discrete pillars of the initial portion ultimately may be connected only indirectly through the porous material, i.e. they are not in direct contact. As shown in FIG. 4A, the initial portion 18 of the support structure 16 may alternatively be formed as a continuous, interconnected piece, or may begin as discrete pillars which are then joined together by additional layers from the additive manufacturing process. FIGS. 4B-4E show cross-sectional views of the initial portion of the support structure of FIGS. 2 and 3, these are not intended to limit the breadth of limitless sizes and shapes of the support structure.

According to one method of the present disclosure, the first additive manufacturing step, as shown in FIGS. 2 and 3, may also include forming an initial portion 21 of a connector port 20 along with the initial portion 18 of the support structure. The initial portion 21 of the connector port 20 may similarly be discrete pillars or connected as a continuous piece of material.

As shown in FIGS. 5A, 6A, 7A, 8A, and 9A, the first additive manufacturing step may include forming at least one connection projection 19 integral with and extending from the initial portion 18 of the support structure 16. The connection projection 19 may extend in a direction parallel to the vertical axis of the filter 10. The connection projection 19 is formed having a predetermined shape and a predetermined height, and is preferably smaller in area than the initial portion 18. Various shapes of the connection projections 19 are shown in FIGS. 5A, 6A, 7A, 8A, and 9A.

When the initial portion 18 of the support structure 16 includes the connection projection 19, the secondary portion 22 of the support structure 16 (discussed further herein) may be formed as a continuation of the at least one connection projection 19 during the second additive manufacturing step, such that the secondary portion 22 of the support structure 16 is spaced apart from the initial portion 18 of the support structure 16 at a distance equal to the height of the connection projection 19. The height of the at least one connection projection may correspond to a thickness of the porous filtration material 14.

As shown in FIGS. 5B, 6B, 7B, 8B, and 9B, according to one form of the present disclosure, the method may further include the step of forming at least one cut-thru hole, opening or slit as a passageway 17 through the porous filtration material 14 in the direction parallel to the vertical axis of the filter. The at least one passageway 17 may correspond to the size and shape of the at least one connection projection 19. According to this form of the present disclosure, the step of positioning the porous filtration material 14 above the initial portion 18 of the support structure 16 may include aligning the at least one connection projection 19 within the passageway 17 in the porous filtration material 14. Providing the support structure 16 with the connection projections 19 and providing the porous filtration material 14 with passageways 17 allows the plastic layers formed during the additive manufacturing steps to bond directly to one another rather than having an intervening layer of porous filtration material 14. This may be particularly beneficial when the porous filtration material 14 is particularly dense or contains particularly small pores. The passageway 17 may be omitted based on filter design parameters. For example, the passageway 17 may be omitted when using coarse filtration material that has a propensity of pore or mesh openings that are greater than 40-70 micron. The coarse filtration material provides an opening for bonding of the support structure material through the mesh.

As shown in FIGS. 5A-9B, the connection projection(s) 19 may have various shapes and configurations. For example, in FIGS. 5A and 7A, the connection projections are dots. The number of connection projections 19 may be varied based on design requirements. In FIG. 6A, the connection projection 19 is a pattern of dots connected by bars. As shown in FIG. 8A, the connection projection 19 is a plurality of linear bars, and in FIG. 9A, the connection projections 19 are discrete bars or rectangles configured in T-shapes.

As shown in FIGS. 5B, 6B, 7B, 8B, and 9B, the method further includes positioning the porous filtration material 14 above or on the initial portion 18 of the support structure 16. A single layer or a plurality of layers of porous filtration material may be layered above or on the initial portion 18 of the support structure 16. The porous filtration material 14 may be similarly positioned above or on the initial portion 21 of the connection port 20 in instances when the first additive manufacturing step includes forming an initial portion 21 of a connector port 20.

As shown in FIG. 10, the manufacturing method continues by performing a second additive manufacturing step to form a secondary portion 22 of the support structure 16 as a continuation of the initial portion 18 of the support structure 16 such that the porous filtration material 14 is positioned between the initial 18 and secondary portions 22, thereby joining the support structure to the filtration material. In other words, the portions 18 and 22 of the support structure 16 are joined together through the filtration material 14, e.g. either directly or at the connection projection(s) 19. The secondary portion 22 of the support structure 16 may be formed as a continuous piece, as shown in FIG. 10, or may be formed as a plurality of discrete pillars. The secondary portion 22 is formed above the initial portion 18 of the support structure 16; however the secondary portion 22 need not be identical in shape or size as the initial portion 18. For example, the initial portion 18 may be formed as discrete pillars, while the secondary portion is formed as a connected, continuous piece, or vice versa. Alternatively, both portions may be continuous or discrete.

The second additive manufacturing step may also include forming a secondary portion 23 of the connector port 20. In this case, the porous filtration material 14 is positioned between a plurality of layers of the connector port 20, namely between the initial portion 21 and the secondary portion 23 of the connector port 20, thereby joining the connector port 20 to the filtration material 14. As shown in FIG. 11A to 13B, additional additive manufacturing steps may be undertaken to continue to form details of the connector port 20. Initial portions 18, 21 may be formed in different sizes and shapes than the secondary portions 22, 23, extend laterally therefrom, and may have varying cross-sections. These initial portions 18, 21 will ultimately lie within the interior of the filter.

As shown in FIG. 14A, the method continues by positioning a first portion 24 of the porous filtration material 14 to overlay a second portion 26 of the porous filtration material 14. This may be accomplished by folding the layer of porous filtration material 14 upon itself or by adding a second discrete layer of porous filtration material 14. As shown in FIG. 14B, the overlaying first portion 24 and second portion 26 of the porous filtration material 14 results in one of the initial portion 18 of the support structure 16 or the secondary portion 22 of the support structure 16 being positioned between the first portion 24 and the second portion 26 of the porous filtration material. Likewise, the initial portion 21 or secondary portion 23 of the connector port will be positioned between the portions 24 and 26 of the filtration material 14 if a connector port was formed in the first or second additive manufacturing steps.

Referring again to FIG. 1 along with FIG. 14A and FIG. 14B, the method further includes connecting the first portion 24 of the porous filtration material 14 to the second portion 26 of the porous filtration material 14 at a seam 28 to define a pocket within the filter body 12 between the first portion 24 and second portion 26 of the porous filtration material 14. The first portion 24 and second portion 26 of the porous filtration material may be connected around the entire perimeter of the filtration material 14 or may be connected around only a portion of the perimeter of the filtration material 14, for example when the single layer of porous filtration material 14 is folded. Porous filtration material 14 is secured along its periphery to direct fluid flow through the porous filtration material 14 and axially out the connector port 20.

The support structure 16 provides structure and rigidity to the filtration material 14 that otherwise is not self-supporting. The support structure 16 additionally helps to maintain spacing between the first 24 and second portions 26 of the filtration material 14, e.g. via initial portions 18, 21, so the filter 10 retains its desired efficiency.

It will also be recognized that the support structure only need be connected to one portion (e.g. first portion 24) of the porous filtration material 14, and the other portion (e.g. second portion 26) which forms one entire side of the filter, is completely open and free from obstruction. Alternately, the porous filtration material 14 may be connected on both sides or neither side of the filter to the support structure.

According to various forms of the present disclosure, a plurality of different plastic materials may be used during the first and second additive manufacturing steps to form at least one living hinge on the support structure 16. For example, in FIG. 5A a living hinge 25 is formed between sections of the support structure 16 to allow easier bending of the filter, e.g. at a predetermined point and degree. Additionally, a plurality of materials may be used during the first and second additive manufacturing steps to form at least one sealing region on the support structure 16. For example, a seal 29 may be integrally formed on the connector 20. The plurality of materials may include plastics and elastomerics. This sealing region functions as a compressible or pliable surface that deforms during filter use to create a seal with a mating component. Additionally, according to various forms of the present disclosure, the support structure 16 may be formed having a non-uniform cross sectional shape in the vertical axis direction.

Figure 18:
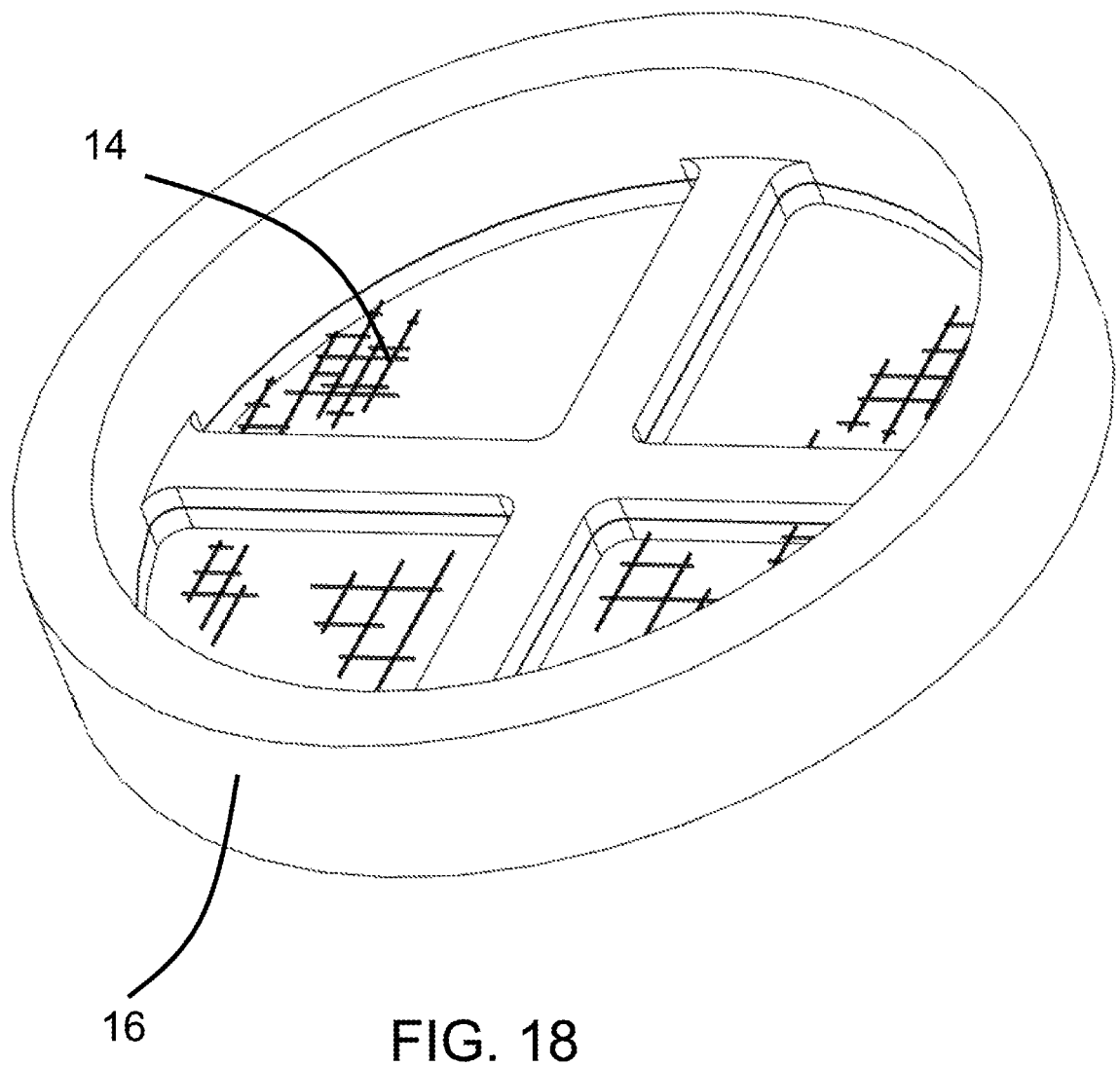
Figure 19:
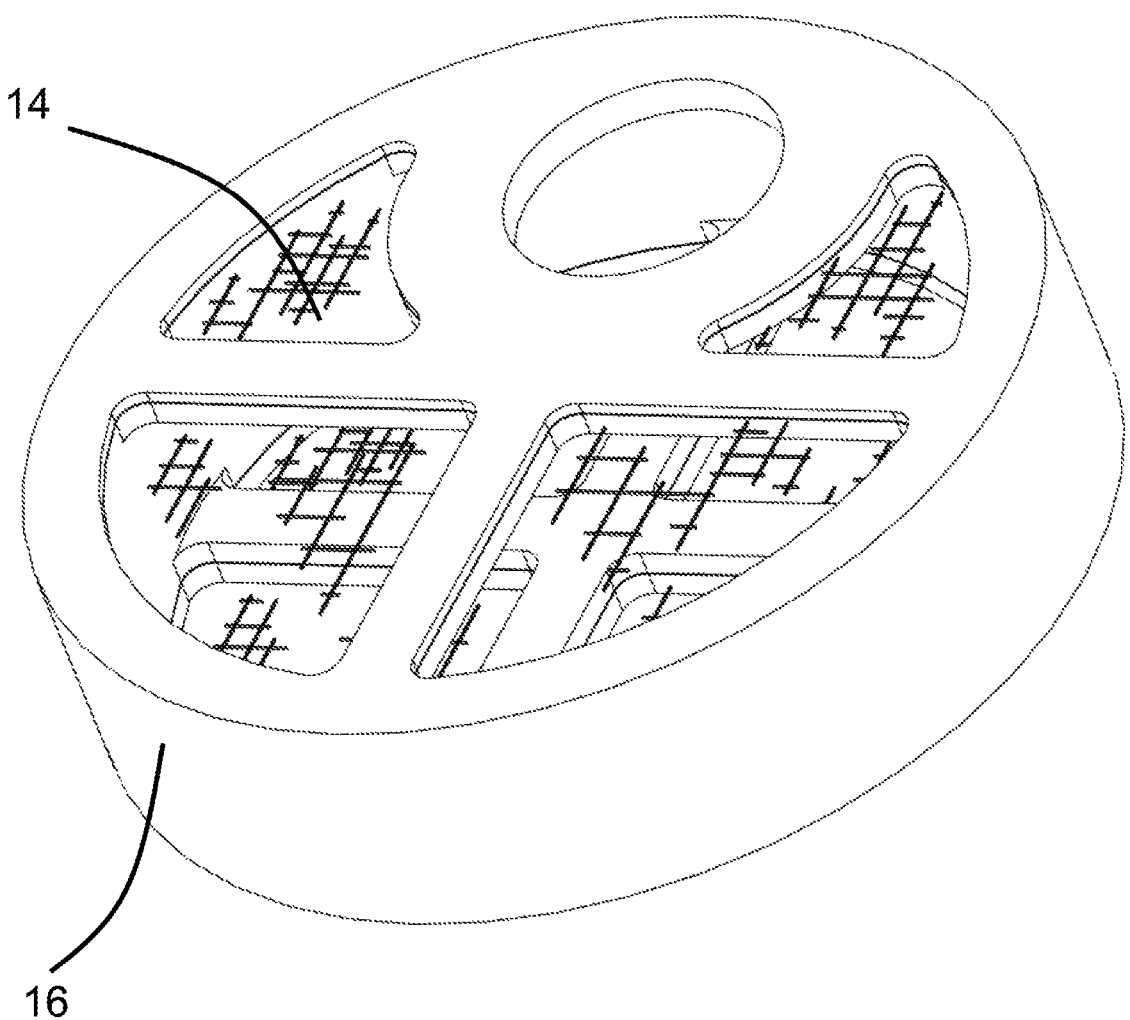
Figure 20:
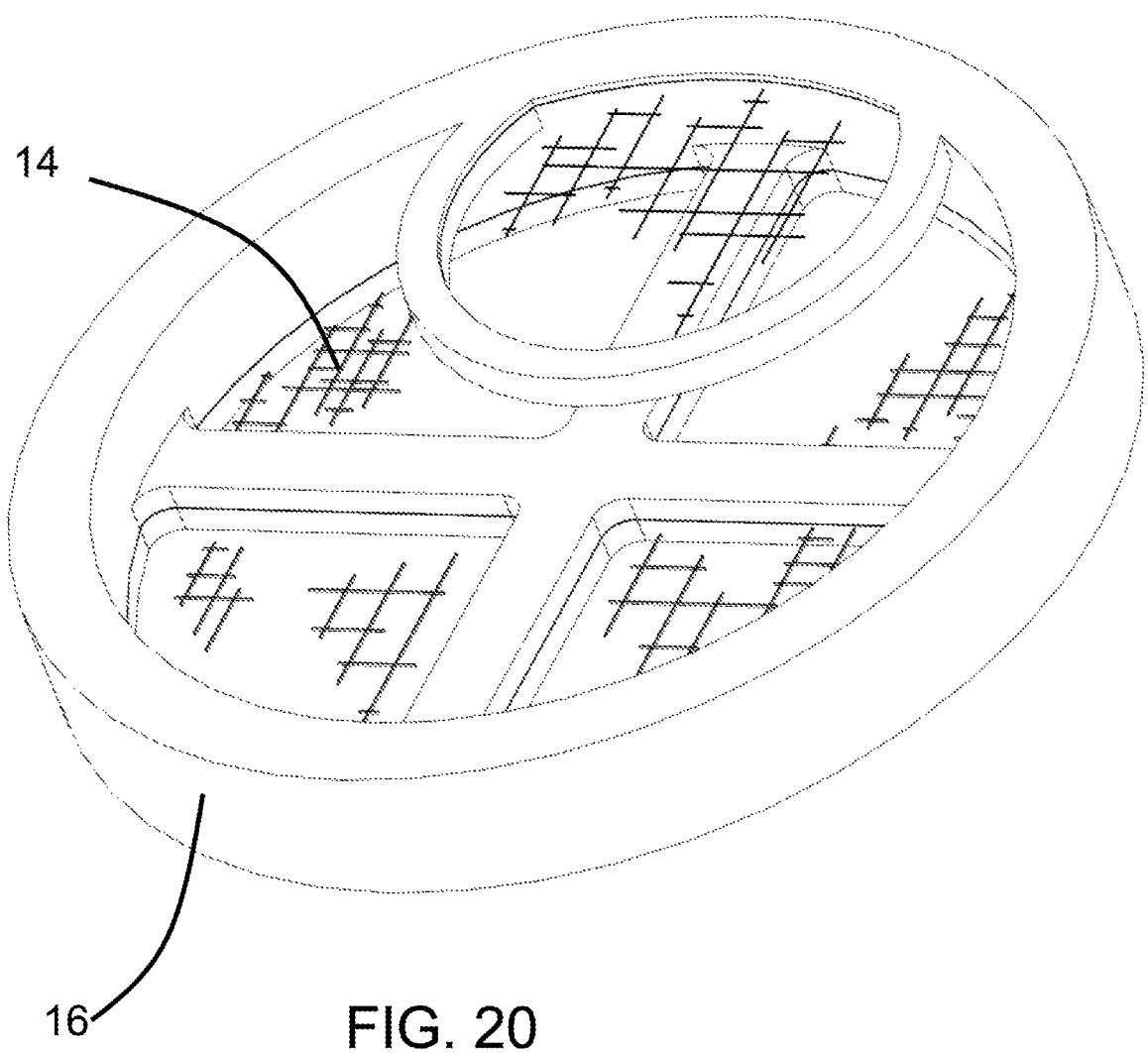
Figure 21:
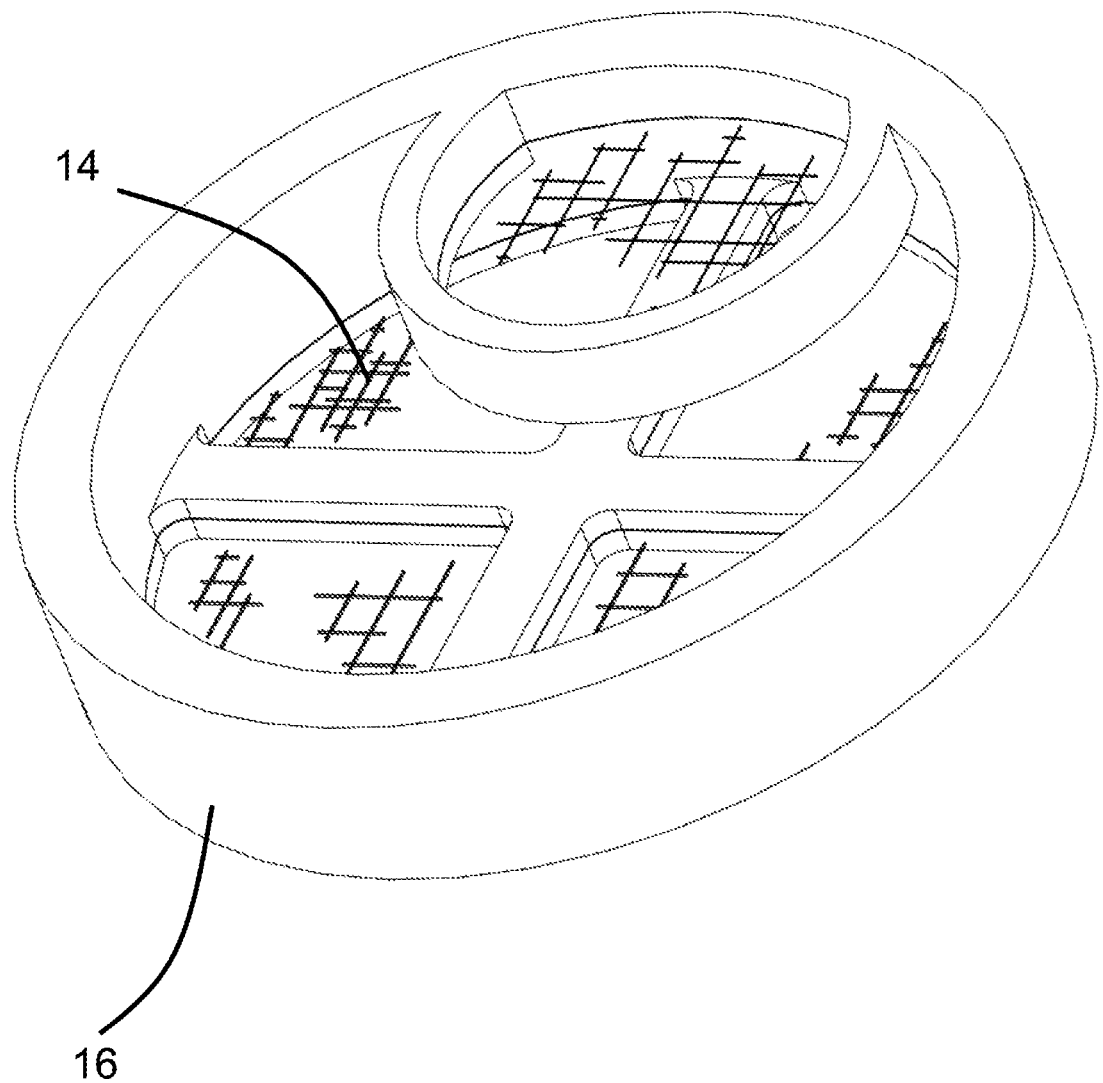
Figure 22:
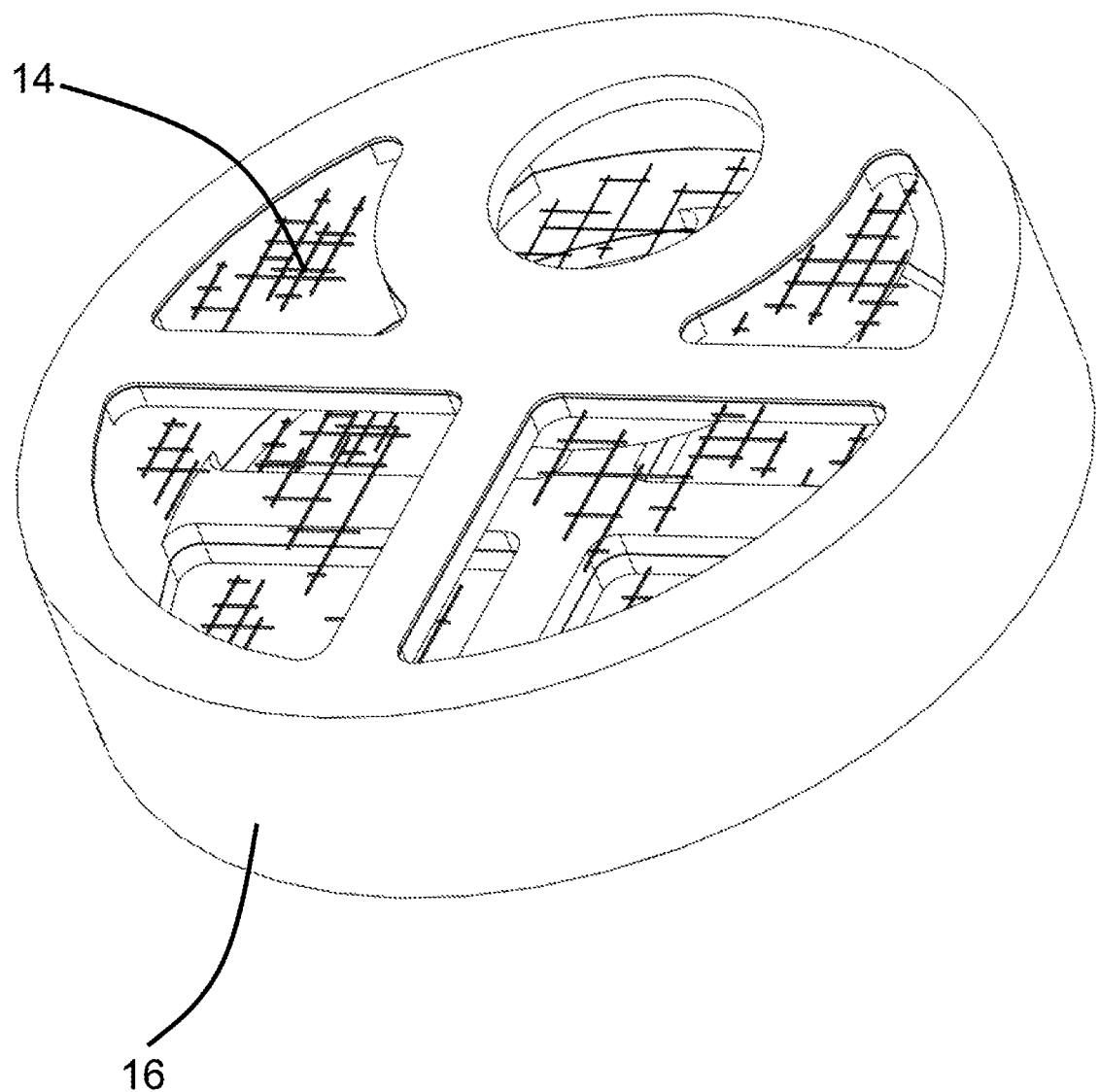
Figure 23:
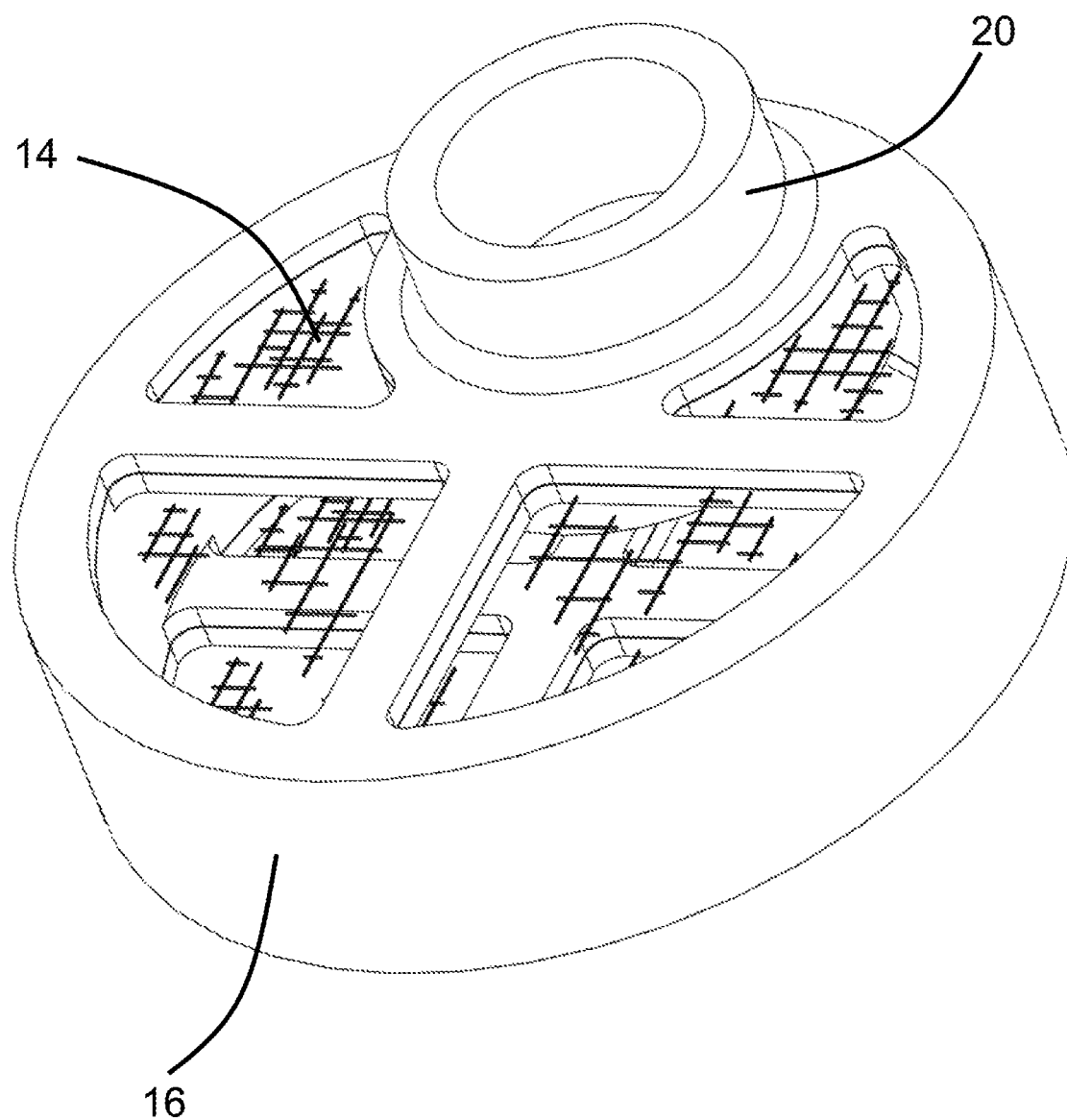
Figure 24:
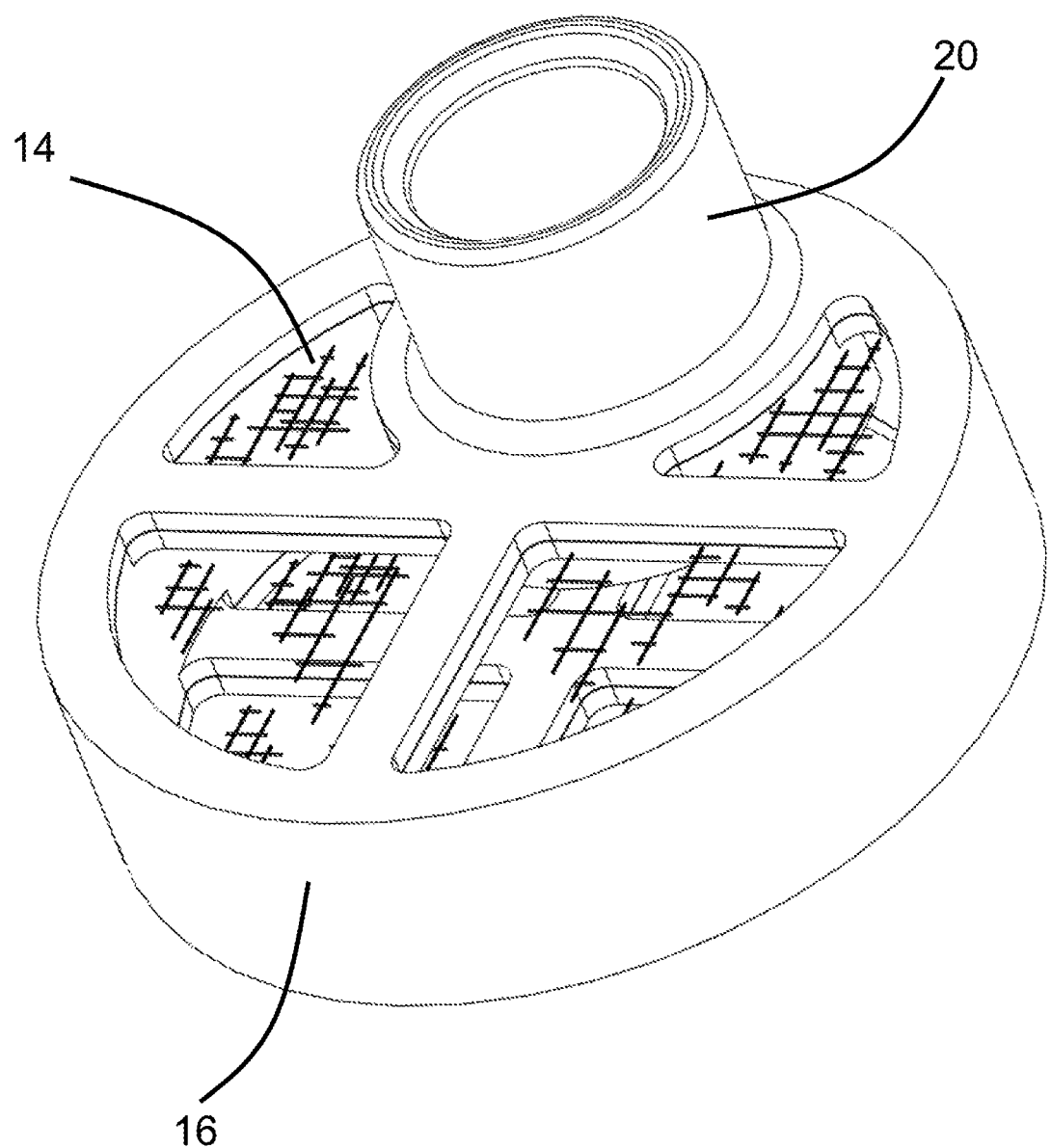

FIG. 15 shows a filter or strainer for filtering fluids in a fluid system manufactured according to another form of a manufacturing method of the present disclosure. The fluid filter 10 comprises a porous filtration material 14 and a support structure 16. As shown in FIG. 16, the method includes forming the support structure 16 one layer at a time using additive manufacturing. The support structure 16 may have any predetermined geometry. Using additive manufacturing, layers of plastic material may be laid down repeatedly until the structure achieves a desired height. As shown in FIG. 17 the method further includes layering a sheet or sheets of the porous filtration material 14 between a plurality of layers of the support structure 16. The steps of the method may be iteratively performed a predetermined number of times, as shown in FIGS. 18 and 19. As shown in FIGS. 23 and 24, the support structure 16, may be formed to include a connector port 20. The support structure 16 may be formed having a non-uniform cross sectional shape in a vertical direction. Sheets of filtration material 14 may be layered within the support structure 16 spaced apart at predetermined increments. A plurality of plastic materials may be used during the additive manufacturing forming step to form at least one living hinge and/or at least one sealing region on the support structure 16.

As shown in FIG. 17, the filter formed according to the present disclosure may be a flat disk with support structure 16 and porous filtration material 14.

Alternately, as shown in FIGS. 25A and 25B, the filter may be formed with the support structure 16 around pleated porous filtration material 30. This pleated porous filtration material 30 is porous filtration material 14 that has been folded into pleats to increase the surface area. The support structure 16 is formed using the additive manufacturing forming process around the sides and edges of the pleated porous filtration material.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of manufacturing a filter for filtering fluids, wherein the filter comprises a filter body formed of a porous filtration material and a plastic support structure, the filter defining horizontal and vertical axes, the method comprising:
performing a first additive manufacturing step to form an initial portion of the support structure;
positioning a first portion of the porous filtration material above or on the initial portion of the support structure;
performing a second additive manufacturing step to form a secondary portion of the support structure as a continuation of the initial portion of the support structure such that the first portion of the porous filtration material is positioned between the initial and secondary portions, thereby joining the support structure to the porous filtration material;
positioning a second portion of the porous filtration material relative to the first portion of the porous filtration material such that the second portion overlies the first portion of the porous filtration material; and
connecting the first portion of the porous filtration material to the second portion of the porous filtration material at a seam to define a pocket within the filter body between the first portion and second portion of the porous filtration material, the support structure configured to maintain spacing between the first and second portions of the filtration material.

2. The method of claim 1, wherein the initial portion of the support structure formed during the first additive manufacturing step is a plurality of discrete pillars.

3. The method of claim 2 wherein the discrete pillars are indirectly connected through the porous filtration material.

4. The method of claim 1 wherein the first additive manufacturing step includes forming at least one connection projection integral with and extending from the initial portion of the support structure in a direction parallel to the vertical axis, wherein the at least one connection projection has a predetermined shape and a predetermined height.

5. The method of claim 4 wherein the secondary portion of the support structure is formed as a continuation of the at least one connection projection during the second additive manufacturing step such that the secondary portion of the support structure is spaced apart from the initial portion of the support structure at a distance equal to the height of the connection projection.

6. The method of claim 4 wherein the height of the at least one connection projection corresponds to a thickness of the porous filtration material.

7. The method of claim 4 further comprising the step of forming at least one passageway through the porous filtration material in the direction parallel to the vertical axis, wherein the at least one passageway corresponds to the shape of the at least one connection projection.

8. The method of claim 7 wherein the step of positioning a first portion of the porous filtration material above or on the initial portion of the support structure includes aligning the at least one connection projection within the at least one passageway in the porous filtration material.

9. The method of claim 1, wherein the support structure is formed having a non-uniform cross sectional shape in a direction parallel to the vertical axis.

10. The method of claim 1, wherein the secondary portion of the support structure formed during the second additive manufacturing step is a plurality of discrete pillars.

11. The method of claim 1 further comprising the step of forming an initial portion of a connector port during the first additive manufacturing step, positioning the porous filtration material on the initial portion of the connector port, and forming a secondary portion of the connector port during the second additive manufacturing step, such that the porous filtration material is positioned between a plurality of layers of the connector port, thereby joining the connector port to the filtration material.

12. The method of claim 1 wherein at least one plastic and at least one elastomeric material are used during the first and second additive manufacturing steps to form at least one living hinge on the support structure.

13. The method of claim 1 wherein at least one plastic and at least one elastomeric material are used during the first and second additive manufacturing steps to form at least one sealing region on the support structure.

* * * * *